United States Patent
Rotzoll et al.

(10) Patent No.: US 7,122,781 B2
(45) Date of Patent: *Oct. 17, 2006

(54) METHOD AND SENSING DEVICE FOR MOTION DETECTION IN AN OPTICAL POINTING DEVICE, SUCH AS AN OPTICAL MOUSE

(75) Inventors: Robert R. Rotzoll, Green Mountain Falls, CO (US); Kevin Scott Buescher, Colorado Springs, CO (US); James Harold Lauffenburger, Colorado Springs, CO (US); Gil Afriat, Monument, CO (US)

(73) Assignee: EM Microelectronic-Marin SA, Marin (SE)

( * ) Notice: Subject to any disclaimer, the term of this patent is extended or adjusted under 35 U.S.C. 154(b) by 222 days.

This patent is subject to a terminal disclaimer.

(21) Appl. No.: 10/497,020

(22) PCT Filed: Dec. 3, 2002

(86) PCT No.: PCT/EP02/13686

§ 371 (c)(1),
(2), (4) Date: May 28, 2004

(87) PCT Pub. No.: WO03/049018

PCT Pub. Date: Jun. 12, 2003

(65) Prior Publication Data

US 2005/0062720 A1    Mar. 24, 2005

(51) Int. Cl.
*H01J 40/14* (2006.01)

(52) U.S. Cl. .................... 250/221; 250/208.1
(58) Field of Classification Search ............. 250/221, 250/208.1
See application file for complete search history.

(56) References Cited

U.S. PATENT DOCUMENTS

| 5,288,993 A | 2/1994 | Bidiville et al. |
| 5,644,139 A | 7/1997 | Allen et al. |
| 5,686,720 A | 11/1997 | Tullis |
| 5,703,356 A | 12/1997 | Bidiville et al. |
| 6,124,587 A | 9/2000 | Bidiville et al. |
| 6,249,603 B1 | 6/2001 | Rucklidge |
| 6,362,482 B1 * | 3/2002 | Stettner et al. ........ 250/370.08 |

FOREIGN PATENT DOCUMENTS

EP    1 043 688 A2    11/2000

OTHER PUBLICATIONS

Pending U.S. Appl. No. 10/001,959, filed Dec. 5, 2001 by Inventor: Robert R. Rotzoll entitled "Sensing Device for Optical Pointing Devices Such as an Optical Mouse".

* cited by examiner

*Primary Examiner*—Que T. Le
(74) *Attorney, Agent, or Firm*—Sughrue Mion, PLLC

(57) ABSTRACT

There is described a method as well as a device for motion detect ion in an optical sensing device, such as an optical mouse. A photodetector array comprising a plurality of pixels is used to detect successive light intensity patterns of an illuminated portion of a surface with respect to which a measurement of relative motion is to be determined. Light intensity between neighbouring pixels is compared in order to determine edge direction data descriptive of light intensity differences between the pixels, such data including (i) a first edge condition, or positive edge, defined as a condition wherein light intensity of a first pixel is less than light intensity of a second pixel, and (ii) a second edge condition, or negative edge, defined as a condition wherein light intensity of the first pixel is greater than light intensity of the second pixel. Through comparison of this edge direction data with edge direction data determined from a previous illumination (or by comparing data extracted from this edge direction data) a measurement of the relative motion of the optical sensing device with respect to the illuminated portion of the surface is determined.

37 Claims, 10 Drawing Sheets

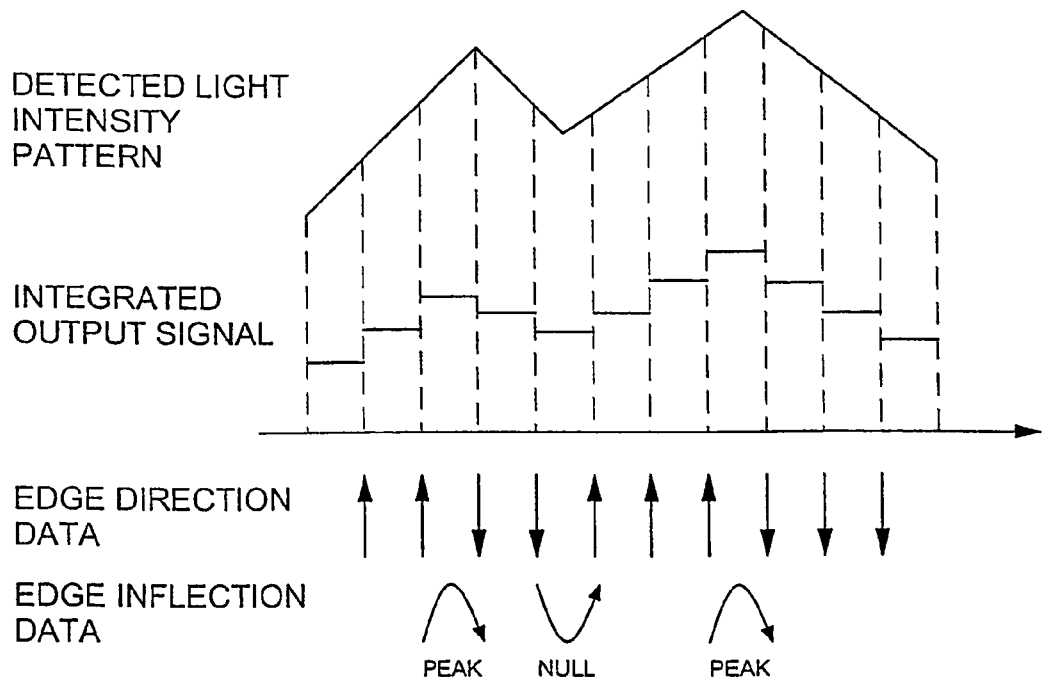
Fig.7
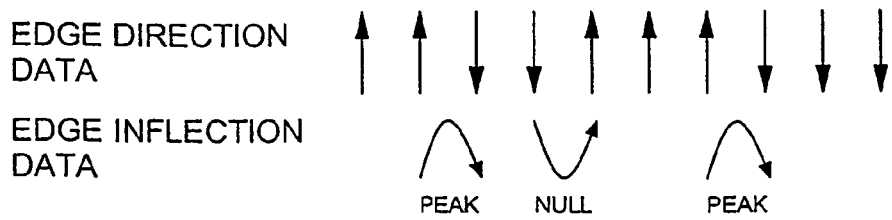
Fig.8
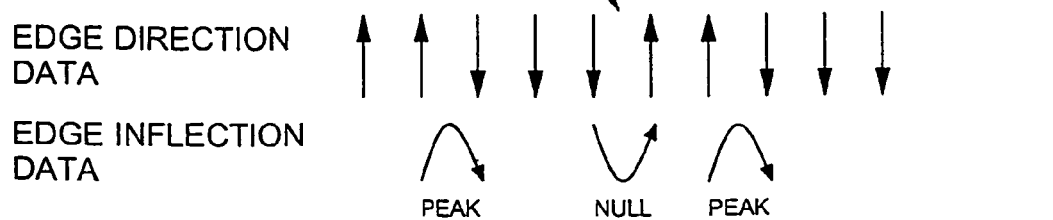

EDGE INFLECTION
MOTION ALONG AXIS X

EDGE INFLECTION
MOTION ALONG AXIS Y

Fig.10a
NO MOTION CASE
EDGE DIRECTION DATA (FLASH 1)  
EDGE DIRECTION DATA (FLASH 2)  
```
R    0   1   0   1   1   0   1   1   = 5
L    1   0   1   0   1   1   0   1   = 5
                                R - L =  0
```
Fig.10b
PARTIAL-PIXEL MOTION CASE  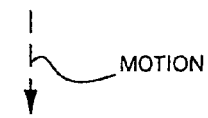
EDGE DIRECTION DATA (FLASH 1)  
EDGE DIRECTION DATA (FLASH 2)  
```
R    0   1   1   1   1   0   1   1   = 6
L    1   0   1   0   0   1   0   1   = 4
                                R - L =  2
```

EDGE DIRECTION
MOTION ALONG AXIS X

EDGE DIRECTION
MOTION ALONG AXIS Y

METHOD AND SENSING DEVICE FOR MOTION DETECTION IN AN OPTICAL POINTING DEVICE, SUCH AS AN OPTICAL MOUSE

FIELD OF THE INVENTION

The present invention generally relates to pointing devices, in particular for controlling the position of a cursor on a screen, such as the display of a personal computer, workstation or other computing devices having a graphic user interface. Such pointing devices may for instance include mice, trackballs and other computer peripherals for controlling the position of a cursor on a display screen.

The present invention more particularly relates to the field of optical pointing devices which comprise an optical sensing device including a photodetector array for measuring the varying intensity pattern of a portion of a surface which is illuminated with radiation and for extracting information about the relative motion between the photodetector array and the illuminated portion of the surface.

BACKGROUND OF THE INVENTION

Optical pointing devices are already known in the art. U.S. Pat. No. 5,288,993, which is incorporated herein by reference, for instance discloses a cursor pointing device utilizing a photodetector array and an illuminated target ball having randomly distributed speckles. U.S. Pat. No. 5,703,356 (related to the above-mentioned U.S. Pat. No. 5,288,993), which is also incorporated herein by reference, further discloses (in reference to FIGS. 23A and 23B of this document) an optical pointing device in the form of a mouse which does not require a ball and wherein light is reflected directly from the surface over which the pointing device is moved.

The imaging technique used in above-cited U.S. Pat. Nos. 5,288,993 and 5,703,356 in order to extract motion-related information is based on a so-called "Edge Motion Detection" technique. This "Edge Motion Detection" technique essentially consists in a determination of the motion of edges (i.e. a difference between the intensity of pairs of pixels) in the image detected by the photodetector array. Edges are defined as spatial intensity differences between two pixels of the photodetector array. The relative motion of each of these edges is tracked and measured so as to determine an overall displacement measurement which is representative of the relative movement between the photodetector array and the illuminated portion of the surface.

More particularly, according to U.S. Pat. No. 5,288,993, edges are determined between pairs of pixels aligned along a first axis of the photodetector array (for example in each column of the photodetector array) and between pairs of pixels aligned along a second axis of the photodetector array (for example in each row of the photodetector array). FIG. 1 depicts three pixels of a photodetector array, a first pixel or current pixel P, a second pixel Pright aligned with the first pixel P along a first axis 101, and a third pixel Pup aligned with the first pixel P along a second axis 102. Pixels Pright and Pup are shown as being disposed on the right side and top side of pixel P for the purpose of explanation only. It will be appreciated that axes 101 and 102 may be orthogonal (as shown) or alternatively non orthogonal. It will also be appreciated that the pixels are not necessarily disposed so as to form a regular array having rows and columns. Other suitable arrangements may very well be envisaged.

For the purpose of simplification, the pixels of FIG. 1 are either shown as being white or hatched, a hatched pixel denoting an illuminated pixel. In this case, pixel P is illuminated and first and second edge conditions Ex, Ey exist respectively between pixels P and Pright along the first axis 101 and between pixels P and Pup along the second axis 102.

According to U.S. Pat. No. 5,288,993 and U.S. Pat. No. 5,703,356, the displacement measurement is evaluated, on the one hand, based on a normalized difference between the number of edges Ex which move in a first direction along the first axis 101 and edges Ex which move in the opposite direction along the first axis 101 (for example edges which move from left to right and right to left in each row of the photodetector array), and, on the other hand, based on a normalized difference between the number of edges Ey which move in a first direction along the second axis 102 and edges Ey which move in the opposite direction along the second axis 102 (for example edges which move downwards and upwards in each column of the photodetector array).

Relative motion of edges is determined by comparing the position of these edges in the photodetector array at a first point in time with the position of edges in the photodetector array at a subsequent point in time. The optical pointing device thus typically comprises a light source (such as an infrared LED) which intermittently illuminates the portion of the surface in accordance with a determined sequence, and the pixel outputs of the photodetector array are sampled in accordance with the determined sequence to provide basis for the determination of two successive edge frames that are compared to each other in order to determine a relative motion measurement.

According to one embodiment of U.S. Pat. No. 5,288,993 and U.S. Pat. No. 5,703,356 a differential technique is advantageously used in order to determine an edge condition between two pixels. According to this embodiment, an edge is defined as existing between two pixels if the ratio of intensities of the two photosensitive elements is larger than a determined level. An edge may thus be defined mathematically by the following Boolean expression:

Intensity[PIXEL 1]>K Intensity[PIXEL 2]

OR

K Intensity[PIXEL 1]<Intensity[PIXEL 2]   (1)

where K is a selected scaling factor.

The edge condition Ex between two pixels along the first axis 101 in FIG. 1 (or horizontal edge condition) may accordingly be defined by the following Boolean expression:

$Ex$=Intensity[pixel$P$]>$K$Intensity[pixel$P$right]

OR

K Intensity[pixel $P$]<Intensity[pixel $P$right]   (2)

Ex at a high state meaning that there exists an edge between the current pixel and the pixel on its right.

Similarly, the edge condition Ey between two pixels along the second axis 102 in FIG. 1 (or vertical edge condition) may accordingly be defined by the following Boolean expression.

$Ey$=Intensity[pixel $P$]>$K$ Intensity[pixel $P$up]

OR

K Intensity[pixel $P$]<Intensity[pixel $P$up]   (3)

Ey at a high state meaning that there exists an edge between the current pixel and the pixel on top.

It will be appreciated that conditions Ex and Ey above are not dependent on the direction or sense of the edge but simply indicate whether an edge exists or not between two pixels.

The above definitions and associated motion detection algorithms described in U.S. Pat. No. 5,288,993 and No. 5,703,356 have been used with great success in optical trackballs, i.e. optical pointing devices which detect light intensity patterns of an illuminated ball which is manipulated by the user. The above definitions and associated algorithms however require that the detected light intensity patterns exhibit clearly defined light intensity differences. Accordingly, the surface of the ball is covered with a plurality of randomly shaped markings in a color which exhibits great contrast with respect to the background. In addition, these markings (generally in the shape of spots) need to have a predetermined size. Referring to U.S. Pat. No. 5,288,993, the size of these markings is for instance said to be in the range of 0.5 $mm^2$ to 0.7 $mm^2$, with a density of about one spot per square millimeter. The size of these markings is relatively independent of the diameter of the ball but however depends largely on the resolution and size of the photodetector array. As mentioned in U.S. Pat. No. 5,703,356, the image of a single spot on the sensor should, as a minimum, cover the center to center distance between two adjacent pixels (or pixel pitch). In practice, however, the preferred typical dot size has been selected so that the surface of the image of the dot covers about five pixels. By complying with the above requirements, a number of edges which remains substantially constant and which is substantially less than the number of pixels may be determined and used for motion detection.

A serious problem however arises when applying the above motion detection scheme to optical pointing devices where the illuminated surface does not exhibit a predetermined pattern, such as in the case of an optical "ball-less" mouse which directly uses light reflected from a random surface, such as paper or the surface of a desk. An optical mouse not requiring any ball is described in U.S. Pat. No. 5,703,356, but this embodiment requires that the illuminated surface exhibits a suitable pattern having sufficient numbers of dark and light areas of sufficient size.

In any case, when applying the above technique to optical sensing devices which use an uncharacterised surface as reference for motion detection, edges as defined above are actually detected between every pixels. Since specific and well-defined patterns of edges cannot clearly be detected and tracked, it is accordingly impossible to derive any measurement of the relative motion between the optical sensing device and the illuminated surface. In practice, the above-mentioned motion detection technique is therefore not applicable and alternative solutions need to be found.

It is accordingly an object of the present invention to provide a solution that is more suited to an application in an optical pointing device where the illuminated surface which is used as reference for motion detection is uncharacterised and produces purely random light intensity patterns.

It should be mentioned at this point that some solutions to the above goal are already known in the art. U.S. Pat. No. 5,578,813 and No. 5,644,139 for instance disclose a motion detection principle which is based on correlation of consecutive image frames outputted by the photodetector array. According to this motion detection principle, comparison of light intensity between neighbouring pixels is however not performed to provide any information concerning spatial intensity differences (i.e. edges) between neighbouring pixels. Correlation of successive image frames as proposed in the just mentioned documents however implies some limitations. In particular, in order to derive a sufficiently precise measurement of relative motion, it is in practice required to illuminate the reference surface with a very low angle with respect to the surface, which angle is typically within sixteen degrees of the surface as more precisely described in U.S. Pat. No. 5,686,720. This leads to constraints in the construction of the optical pointing device.

In addition, image frame correlation techniques as proposed in these documents show some limitations when analysing grayscale image frames, the complexity of the correlation process increasing exponentially with the depth of intensity of the image. In practice, the application of the above correlation techniques to motion detection in optical device is limited to the analysis of binary black-and-white images.

In contrast, detecting spatial intensity differences (i.e. edges) between pixels of the image frame (or in other words pre-processing the image frames to extract binary data descriptive of light intensity differences between neighbouring pixels) and comparing this extracted data with previously extracted data in order to determine a measurement of relative motion is particularly efficient in terms of sensitivity to slight variations of intensity between pixels. With this technique, one can easily extract characterising features and patterns that may be tracked and exploited directly for motion detection. It may also be demonstrated that this technique is particularly robust and simple in terms of required processing.

SUMMARY OF THE INVENTION

According to a first aspect of the invention, there is provided a method for measuring relative motion between an illuminated portion of a surface and an optical sensing device comprising a photodetector array, this method comprising the steps of:

a) detecting by means of the photodetector array a first light intensity pattern of the illuminated portion of the surface at a first point in time;

b) comparing light intensity between neighbouring pixels of the photodetector array and determining edge direction data from the detected first light intensity pattern, which data is descriptive of light intensity differences between the neighbouring pixels and includes:

a first edge condition, or positive edge, defined as a condition wherein the light intensity of a first pixel is less than the light intensity of a second pixel; and a second edge condition, or negative edge, defined as a condition wherein the light intensity of the first pixel is greater than the light intensity of the second pixel;

c) storing said edge direction data or data extracted therefrom;

d) detecting a second light intensity pattern of the illuminated portion of the surface at a second point time;

e) comparing light intensity between neighbouring pixels of the photodetector array and determining said edge direction data from the second light intensity pattern; and f) determining a measurement of the relative motion between the optical sensing device and the illuminated portion of the surface based on a comparison of said edge direction data determined at steps b) and e) or based on a comparison of data extracted from said edge direction data.

According to a second aspect of the invention, there is also provided a motion detection device for detecting relative motion with respect to an illuminated portion of a surface, this motion detection device comprising:

a photodetector array including a plurality of pixels aligned along first and second axes for detecting a light intensity pattern of the illuminated portion of the surface;

comparator means coupled to the photodetector array for comparing light intensity between neighbouring pixels of the photodetector array along both the first and second axes and for outputting edge direction data from said detected light intensity pattern, which data is descriptive of light intensity differences between the neighbouring pixels and includes:

a first edge condition, or positive edge, defined as a condition wherein the light intensity of a first pixel is less than the light intensity of a second pixel; and a second edge condition, or negative edge, defined as a condition wherein the light intensity of the first pixel is greater than the light intensity of the second pixel;

storage means for at least temporarily storing said edge direction data or data extracted therefrom;

processing means for determining a measurement of the relative motion with respect to the illuminated portion of the surface based on a comparison of said edge direction data or data extracted therefrom which is determined from first and second light intensity patterns successively detected by said photodetector array.

A first variant of the method and device is described wherein edge inflection data is further extracted from said edge direction data, said edge inflection data being descriptive of the succession of positive and negative edges along a determined axis of said photodetector array and including:

a first inflection condition, or peak, defined as the succession, along the determined axis, of a positive edge followed by a negative edge; and a second inflection condition, or null, defined as the succession, along the determined axis, of a negative edge followed by a positive edge.

Locations of the above inflection conditions are compared with previous locations of the inflection conditions and the direction of motion of these inflection conditions along the axis is determined based on the result of the comparison. An overall displacement measurement is finally computed from the determined direction of motion of these inflection conditions.

According to a second variant of the method and device, one directly tracks the direction of movement of the positive and negative edges to compute the overall displacement measurement.

According to the invention, and in contrast to the prior edge motion detection technique disclosed in U.S. Pat. No. 5,288,993 and No. 5,703,356, one exploits the direction information of edges as a reference for motion detection. It is to be recalled that according to the prior art solutions, this information concerning the direction of the edges is not at all exploited, only information as regards the actual existence of an edge being used. Since the edge direction information is descriptive of light intensity differences between neighbouring pixels (and accordingly representative of the pattern of the surface from which light is reflected), motion detection may be performed even on random surfaces such as paper or other surfaces such as the surface of a desk or of a mouse pad.

In addition, the invention exhibits great sensitiveness and allows a wide range of illumination angles to be used instead of the required low illumination angles used to increase the contrast of the surface pattern in the correlation techniques of U.S. Pat. No. 5,578,813, No. 5,644,139 and No. 5,686,720. The present invention may furthermore be based on an analysis of grayscale images without this increasing the complexity of the processing.

Other aspects, features and advantages of the present invention will be apparent upon reading the following detailed description of non-limiting examples and embodiments made with reference to the accompanying drawings.

FIGURES

FIG. 7 is a schematic illustration of edge inflection conditions, or peaks and nulls, derived from a sequence of edge direction conditions along a determined axis;

FIG. 8 is a schematic illustration of a first embodiment of the motion detection technique which is based on the tracking of peaks and nulls along one axis;

FIGS. 10a and 10b are schematic illustrations of a second embodiment of the motion detection technique which is based on the tracking of positive and negative edges, in the case of single axis motion detection;

DETAILED DESCRIPTION OF THE INVENTION

Two algorithms will be described in the following description. The first algorithm will be referred to as "Peak/Null Motion Detection" algorithm and the second as "Local Edge Direction Motion Detection" algorithm. Both algorithms use only edge direction data from the pixel array.

Figure 3:
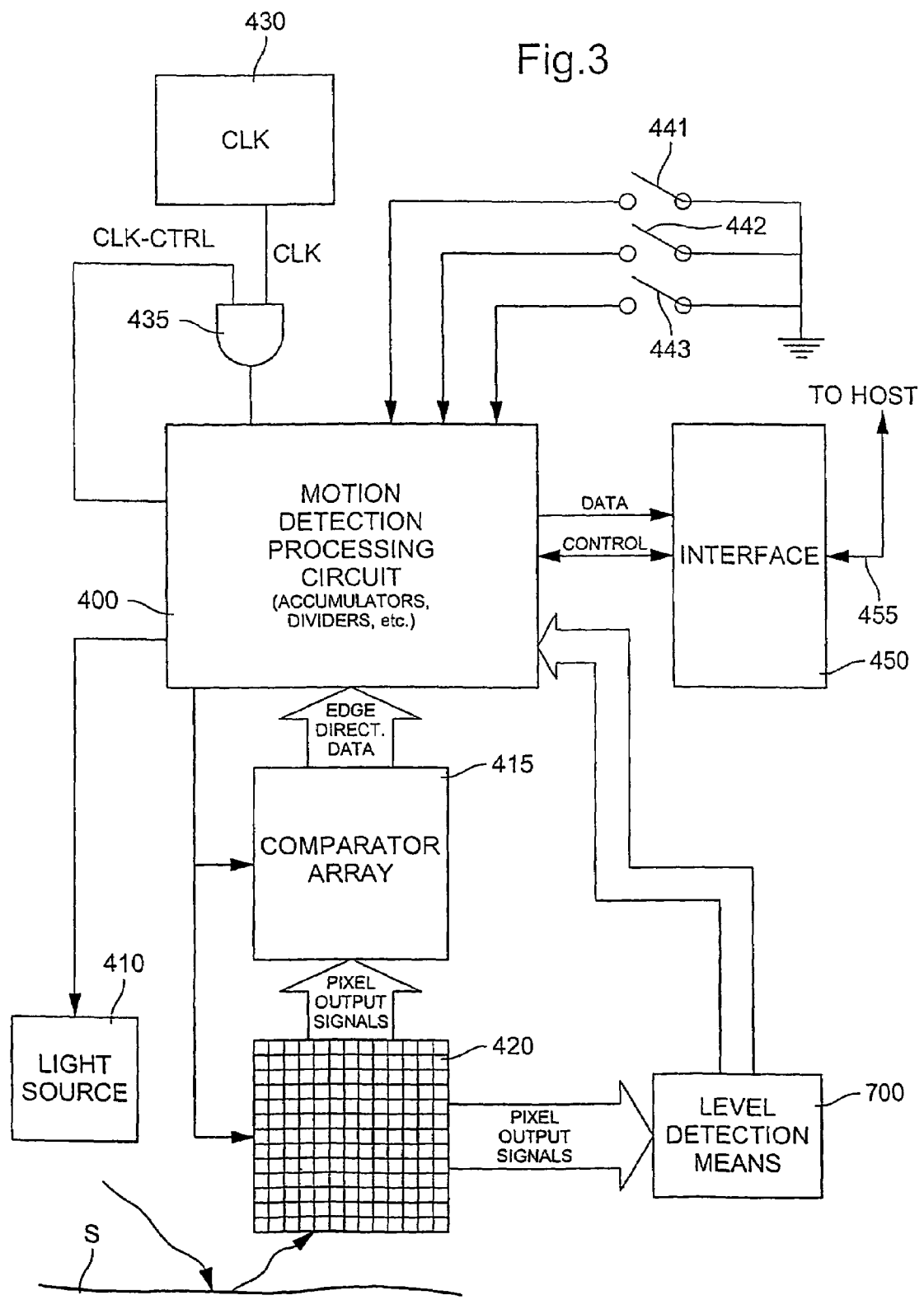
FIG. 3 is a schematic block diagram of an optical pointing device according to the invention.

FIG. 3 is a generalized schematic bloc diagram of an optical pointing device in accordance with the present invention. It comprises a photodetector array 420 including a plurality of pixels, this photodetector array 420 being coupled to processing means 400 (or motion detection processing circuit) which consists, in a non limiting manner, of a micro-controller, microprocessor or other adequate logic circuitry for processing the signals outputted by the photodetector array 420. Motion detection processing circuit 400 in particular includes accumulator circuits and other logic circuits for performing mathematical and logic operations as this will be understood hereinafter.

Figure 4:
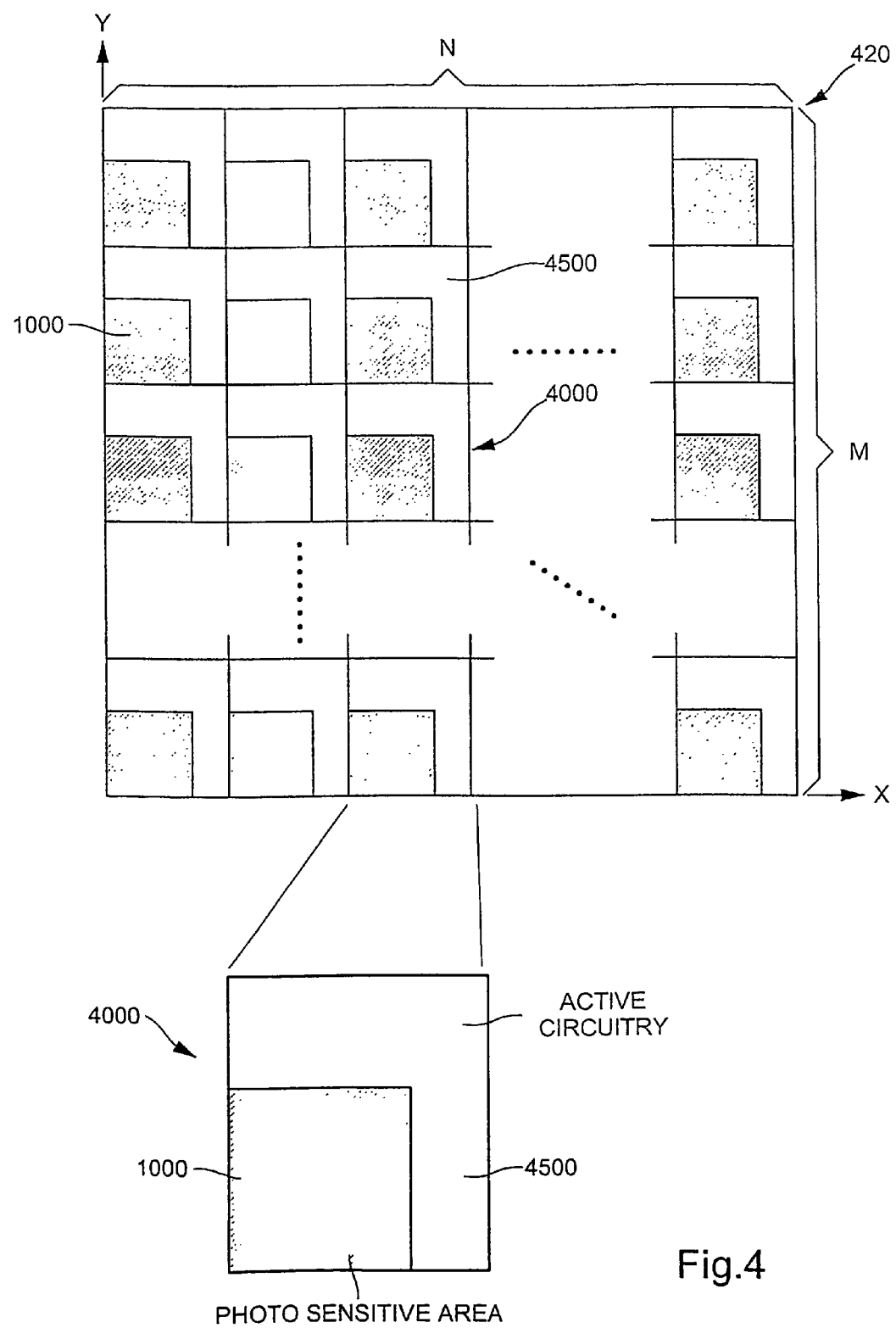
FIG. 4 is a schematic representation of the sensing device's photodetector array and pixel architecture.

As schematically illustrated in FIG. 4, the photodetector array 420 is for instance a regular square array having M pixel rows (parallel to axis x) and N pixel columns (parallel to axis y). A typical configuration is for instance a 20×20 pixels array. Photodetector array 420 may be a square array as shown or may exhibit a substantially circular or polygonal outer perimeter (or any other suitable shape).

Figure 1:
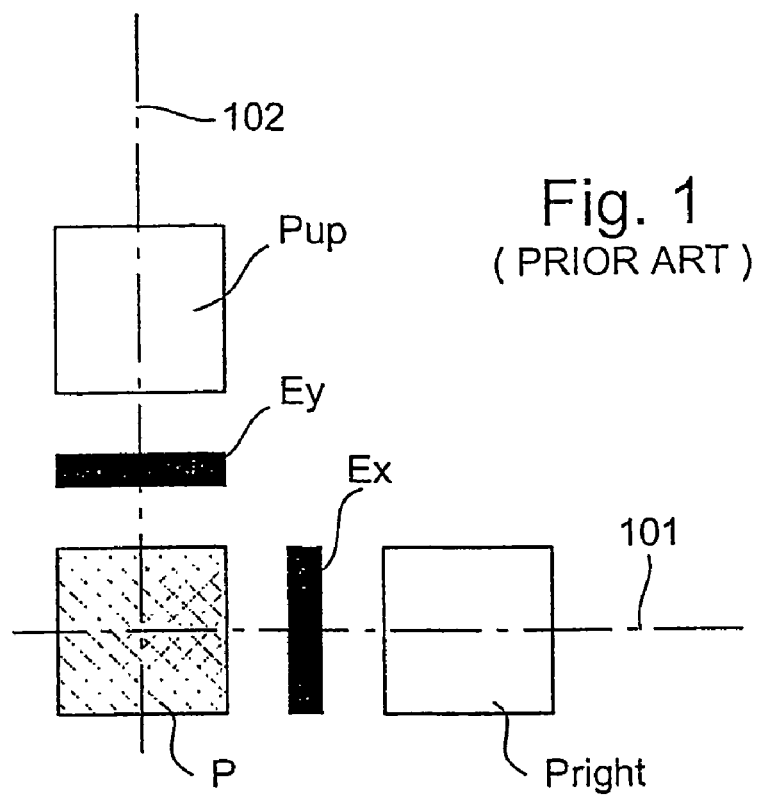
FIG. 1 shows three pixels of a photodetector array aligned along first and second axes and their respective edge conditions according to the definition of the prior art.
Figure 2:
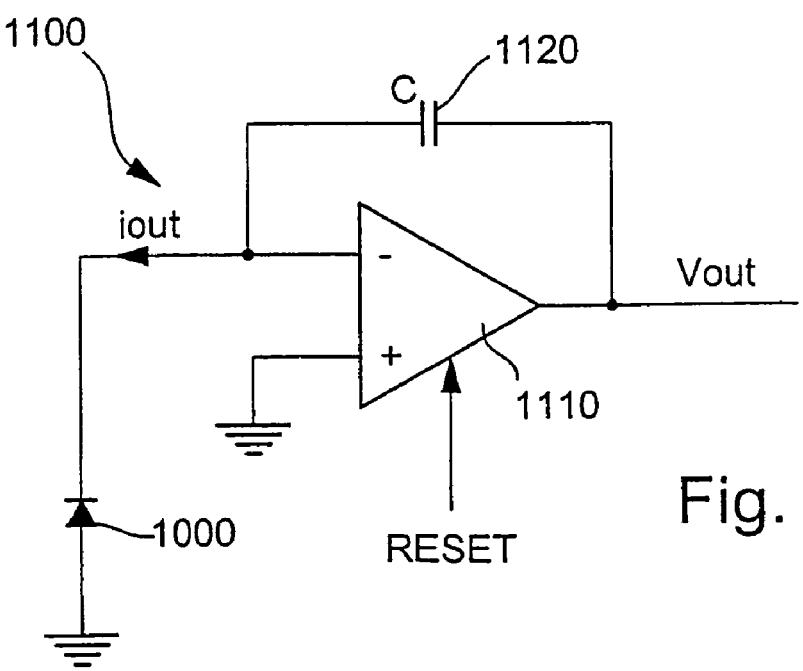
FIG. 2 is a schematic illustration of an integrating circuit used for converting light impinging on a pixel into an electrical signal.

Each pixel of the photodetector array 420, designated by reference numeral 4000, essentially includes a photosensitive area 1000 forming a photodiode (or alternatively a phototransistor) and active circuitry 4500 including preamplifier and conversion means and, eventually, comparator circuits for determining edge conditions between the pixel and at least one of its neighbours. Active circuitry 4500 may for instance include an integrating circuit 1100 as schematically depicted in FIG. 2 for integrating and converting the photocurrent generated by the photosensitive region 1000 into an output signal usable for latter processing. As shown in FIG. 2, integrating circuit 1100 essentially consists of integrating amplifier 1110 having a first input connected to the photosensitive element 1000 and another input connected to a reference potential (such as ground), as well as an integrating capacitor 1120 connected across the output and first input of integrating amplifier 1110. The current iout generated by photosensitive element 1000 is accordingly integrated over time on integrating capacitor 1120 and provided as a voltage output signal Vout on the integrating amplifier output, the integrating and reset phases of the integrating circuit being controlled by means of adequate control signals, in a particular a RESET signal.

Referring again to FIG. 3, a comparator array 415 is preferably interposed between processing means 400 and array 420, this comparator array 415 including a plurality of comparator circuits each for comparing the light intensity of a first pixel of array 420 with the light intensity of a second pixel of array 420 and for outputting a resulting edge direction condition. It will basically be understood that each comparator circuit may alternatively be incorporated in the active region 4500 of each pixel. It will however be understood that putting the comparator circuits outside the pixel array, helps minimizing the non-photosensitive circuit area of the pixel and thereby maximizing sensitivity.

Preferably, processing of the edge information is done outside of the photodetector array, each pixel providing its output signal to a corresponding input of a comparator circuit of comparator array 415 which in turn outputs a resulting edge condition to processing means 400. This allows to reduce the size of the pixel active circuitry and thereby increase the photosensitive area of each pixel for greater sensitivity. This also allows to substantially reduce the pixel array wiring. Within the scope of the present invention, it may however perfectly be envisaged to undertake part of the processing in each pixel.

Still referring to FIG. 3, the optical pointing device further comprises at least one light source 410 (or more) such as a LED, which produces radiation, preferably monochromatic (such as visible or non-visible light—preferably infrared light), that impinges on a portion of a surface S. Surface S may be a planar or non-planar surface, such as a surface over which the pointing device is moved (as in the case of an optical mouse), the surface of a ball (as in the case of an optical trackball) or any other suitable surface that may provide an appropriate intensity pattern for detection by photodetector array 420. It should be mentioned that a light source is not, strictly speaking, necessary and that ambient light reflected by surface S may directly be used.

The optical pointing device typically comprises a window and eventually an optical arrangement (not illustrated) disposed between surface S, on the one hand, and light source 410 and photodetector array 420, on the other hand. These window and optical arrangements are typically designed to protect the optical components of the pointing device from dust and to focus the radiation emitted by light source 410 and the radiation reflected by the illuminated portion of surface S.

The optical pointing device further comprises clock means 430 for supplying a clock signal CLK to processing means 400. This clock signal CLK is used by processing means 400 to derive the necessary timing signals for the digital processing of data and for controlling the operations of photodetector array 420 and pulsing of light source 410. A gating means 435, such as a logic AND gate, is preferably interposed between clock means 430 and processing means 400 to selectively inhibit the supply of clock signal CLK to processing means 400. Activation of this gating means 435 is controlled by processing means 400 via a CLK_CTRL signal. It will be appreciated that clock means 430 is not essential and that clock signal CLK may perfectly be supplied by the host to which the optical pointing device is connected (via the line interface 450).

Three switches 441, 442 and 443 further provide additional control input signals to processing means 400. Activation of these switches 441, 442, 443 is typically controlled by means of corresponding buttons located on the device housing.

Processing means 400 is further adapted to communicate in a bi-directional manner with an interface 450 that communicates in turn with a host system (not illustrated) over a bus 455. Cursor control signals (and eventually other signals related to the optical pointing device) are supplied to the host system over bus 455. Processing means 400 may also receive information, such as configuration signals, over bus 455 from the host system.

As briefly mentioned hereinabove, processing means 400 is essentially designed to intermittently sample the pixel outputs of photodetector array 420 in accordance with a defined sequence. The edge information of two successive samples is compared and a relative motion measurement is extracted by processing means 400. The adequate cursor control signals are then derived from the relative motion measurement and transmitted to the host system via line interface 450.

Preferably, the sensing device further includes level detection means 700 disposed outside of the array 420. Level detection means 700 are designed, on the one hand, to receive the pixel output signals and monitor the levels of these signals in order to derive specific timing signals for operating the sensing device (in particular for controlling the integration and reset procedures of integrating circuits 1100). On the other hand, level detection means 700 are also advantageously adapted to detect the minimum level of the pixel output signals. A more detailed description of the level detection means and its use may be found in U.S. patent application Ser. No. 10/001,963, in the name of the present Applicant, filed on Dec. 5, 2001, entitled "Method, sensing device and optical pointing device including a sensing device for comparing light intensity between pixels", the priority of which is claimed and which is also incorporated herein by reference One may also refer to U.S. patent application Ser. No. 10/001,963 for an extensive description of a particularly advantageous embodiment of the sensing device. In particular, this priority application describes a principle for comparing light intensity between neighbouring pixels which is based on the use of integrating circuits as depicted in FIG. 2 associated with corresponding comparator circuits and on a specific timing scheme for operating these integrating and comparator circuits in order to provide the required edge information (or more precisely the required edge direction data). FIGS. 6A and 6B of this patent application for instance disclose a circuit arrangement for providing four distinct edge direction conditions (the exact definitions of which is given below) which are exploited for motion detection within the scope of the present invention.

Within the scope of the present invention, and in contrast to the prior solutions, a distinction is made between edges according to their "direction". In particular, one defines two distinct edge direction conditions, namely:

a first edge condition, or positive edge, defined as a condition wherein the light intensity of a first pixel is less than the light intensity of a second pixel; and a second edge condition, or negative edge, defined as a condition wherein the light intensity of the first pixel is greater than the light intensity of the second pixel.

It has to be pointed out that this distinction is made by taking into account the direction along which one examines the light intensity of the pixels on a selected axis. Taking FIG. 4 as an example, a first axis, namely axis X, extends with a positive direction from left to right and a second axis, namely axis Y, extends with a positive direction from bottom to top. Accordingly, a positive edge will be defined between a selected pixel and a pixel on its right if the detected light intensity of the selected pixel is less than the light intensity of the pixel on its right. Conversely, and taking the example of two pixels aligned along axis Y, a negative edge will be defined between the selected pixel and a pixel on its upper side if the light intensity of the selected pixel is greater than the light intensity of the upper pixel.

Positive and negative edges are determined according to the above principle between at least first and second neighbouring pixels. It will be appreciated that instead of comparing light intensity between two neighbouring pixels, on may alternatively compare light intensity between first and second subsets of pixels, this requiring summing of the respective pixel output signals of each subset. Such a solution is described with reference to FIG. 13 of the above-mentioned U.S. patent application Ser. No. 10/001,963. A more extensive description of this solution is also described in U.S. patent application Ser. No. 10/001,959 filed on Dec. 5, 2001, also in the name of the present Applicant and entitled "Sensing device for optical pointing devices such as an optical mouse".

Figure 5:
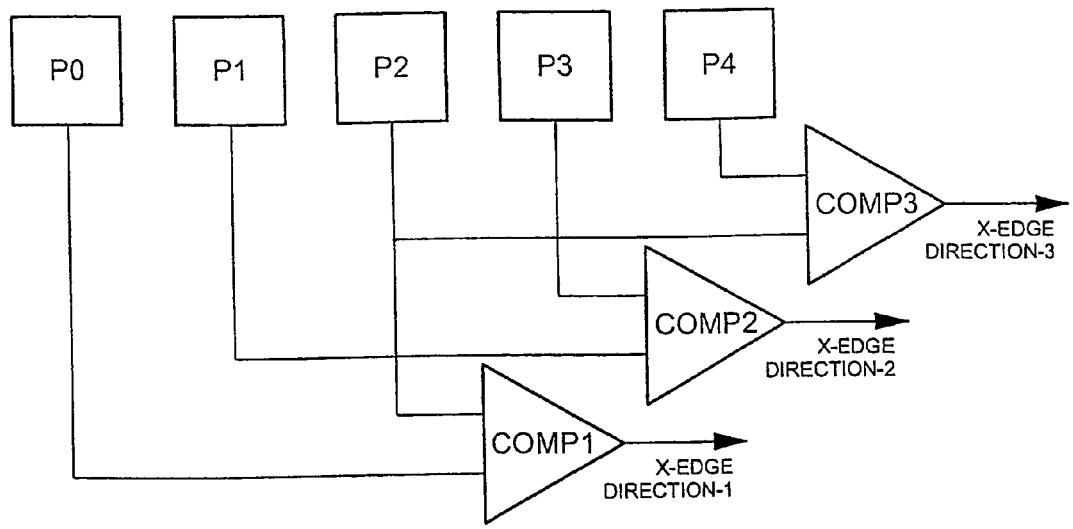
FIG. 5 is a schematic illustration of a preferred way of coupling the photodetector array with the associated comparator circuits to output resulting edge direction conditions, this illustration showing only the interconnection of the pixels and comparator circuits for five pixels aligned on one same axis.
Figure 6:
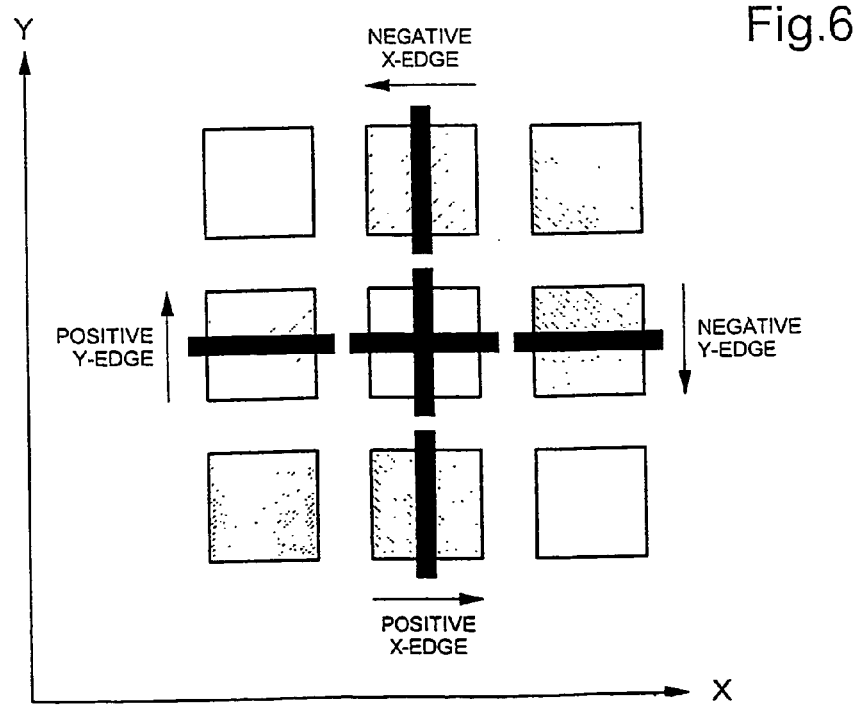
FIG. 6 shows a 3×3 pixel array and respective edge direction conditions, or positive and negative edges, according to the definition of the present invention.

An alternative method for comparing light intensity between neighbouring pixels will now be described with reference to FIGS. 5 and 6, this method being preferably implemented. In FIG. 5, five pixels designated P0 to P4 aligned along an axis are depicted, as well as three comparator circuits COMP1 to COMP3, these comparator circuits being advantageously part of a separate comparator array as shown in FIG. 3 (comparator array 415). Instead of comparing light intensity between two neighbouring adjacent pixels, one preferably compares light intensity between pairs of non-adjacent neighbouring pixels. In particular, comparison may be performed between two pixels aligned along an axis and which are separated by an intermediate pixel located on the same axis. As illustrated in FIG. 5, light intensity detected by pixel P0 is for instance compared by comparator circuit COMP1 with the light intensity of pixel P2, the intermediate pixel being P1 in this case. Similarly, comparator circuits COMP2 and COMP3 are respectively coupled to pixels P1, P3 and P2, P4. The same method is used for both axis of the photodetector array.

This simple method of coupling the comparator circuits with the pixels has the effect of applying some sort of spatial median filter to the intensity pattern detected by the photodetector array, thereby reducing noise. This method actually has the same effect as a method which would consist in summing the pixel output signals of pixels P0 and P1 and comparing this sum with the sum of the pixel output signals of pixels P1 and P2, the advantage of the above method being that no summing circuit is here required. It will be appreciated that other possibilities for comparing light intensity between non-adjacent neighbouring pixels may be envisaged.

As regards the comparison steps performed by the comparator circuits in order to extract the required edge direction data, those steps are preferably performed with implementation of a hysteresis function. The use of comparator circuits with hysteresis prevents randomness of the edge direction condition between first and second pixels showing equal light intensity levels. A possible implementation of such a hysteresis function is described in the above-mentioned U.S. patent application Ser. No. 10/001,963. Alternatively, one may simply design the comparator circuits so that they output either a positive edge condition or a negative edge condition in case of equal light intensity levels.

Using the above alternative method of comparing light intensity between pixels, one may accordingly define that an edge direction condition (positive or negative edge) is situated at a location which basically corresponds to the pixel location of the intermediate pixel. FIG. 6 schematically illustrates this interpretation in case of a 3×3 pixel array. In this Figure, edges are shown as wide dark lines and are "placed" on a pixel as they are the result of comparing its two adjacent pixels using the above alternative method. It will be appreciated that edges are defined along both axes and for each pixel (except in connection with pixels situated on the edges and corners of the photodetector array which do not have two adjacent pixels along the first and/or second axis). One will appreciate that, for a given photodetector array architecture, there exists a predetermined number of edge direction conditions. In the exemplary illustration of FIG. 6, one will for instance notice that three edge direction conditions along axis X and three edge direction conditions along axis Y are defined.

The directions of the edges (which direction defines whether the edge corresponds to a positive edge or to a negative edge) are shown by corresponding arrows, each arrow pointing from the darker pixel to the lighter pixel (a dark pixel depicting a pixel with low light intensity and a light pixel depicting a pixel with high light intensity). Only the directions of the four edge conditions defined between the corner pixels are shown. Reference axes X and Y are also illustrated in FIG. 6. As illustrated, a negative edge is shown as an edge with an arrow pointing in the negative direction with respect to axis X or Y.

As briefly mentioned hereinabove, the defined edge direction data, i.e. negative and positive edges, forms the data on the basis of which motion detection is performed according to the invention (either directly or indirectly as this will be apparent from the following). In both the "Peak/Null Motion Detection" algorithm and the "Local Edge Direction Motion Detection" algorithm, analysis is performed along the X any Y axes independently and summed for the final result.

Referring now more particularly to the first algorithm, i.e. the "Peak/Null Motion Detection" algorithm, each row and column of the photodetector array are further analysed to find specific inflection conditions (hereinafter defined as a first inflection condition, or "peak", and a second inflection condition, or "null") in the direction of successive edges along a selected axis (in practice along both the X and Y axes). As illustrated in FIG. 7, the first inflection condition, or peak, is defined as the succession, along a determined axis (X or Y), of a positive edge (arrow pointing upwards in FIG. 7) followed by a negative edge (arrow pointing downwards in FIG. 7). Similarly, the second inflection condition, or null, is defined as the succession, along the determined axis, of a negative edge followed by a positive edge.

In contrast to the above edge direction conditions, it will be appreciated that the edge inflection conditions do not appear everywhere. Strictly speaking, one should also consider that there exists a third inflection condition representative of the fact that there does not exist, at a selected location, any inflection in the direction of the edges.

Processing of the edge direction data in order to extract the above-defined edge inflection data is relatively simple. Since edge direction data basically consists of binary information (an edge direction being either positive or negative) which may be stored in the form of an array of binary data, extraction simply consists in examining each row and column of the array and finding the locations where a bit of data changes from a first binary state to a second binary state or vice versa.

As regards the required capacity for storing the data for later motion detection processing, it will be appreciated that it is preferable to store the edge direction data and later process this data to extract the above edge inflection data. Indeed one edge direction condition requires only one bit of memory, whereas one edge inflection condition requires two bits of memory in order to code the three possible cases, namely "peak", "null", "neither". In that regard, edge direction data may simply be stored in latches assigned to each pixel of the photodetector array (or strictly speaking to each comparator circuit of the comparator array). It may however alternatively be envisaged to only store the edge inflection data.

Figure 9A:
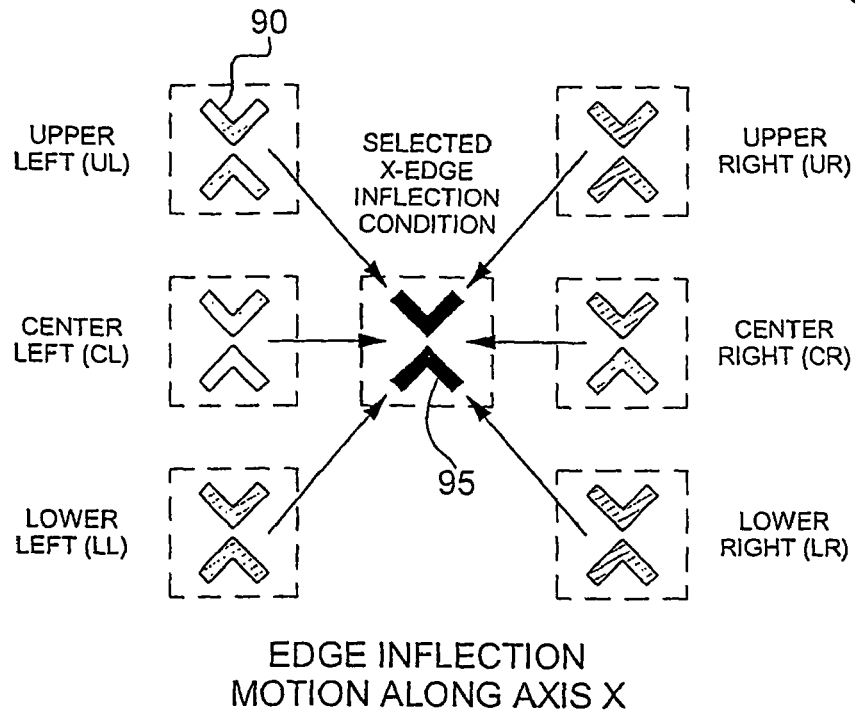
FIGS. 9a and 9b are schematic illustrations of a variant of the motion detection technique illustrated in FIG. 8 for motion detection along first and second axes and which further implements tracking of the peaks and nulls along diagonals of the first and second axes.
Figure 9B:
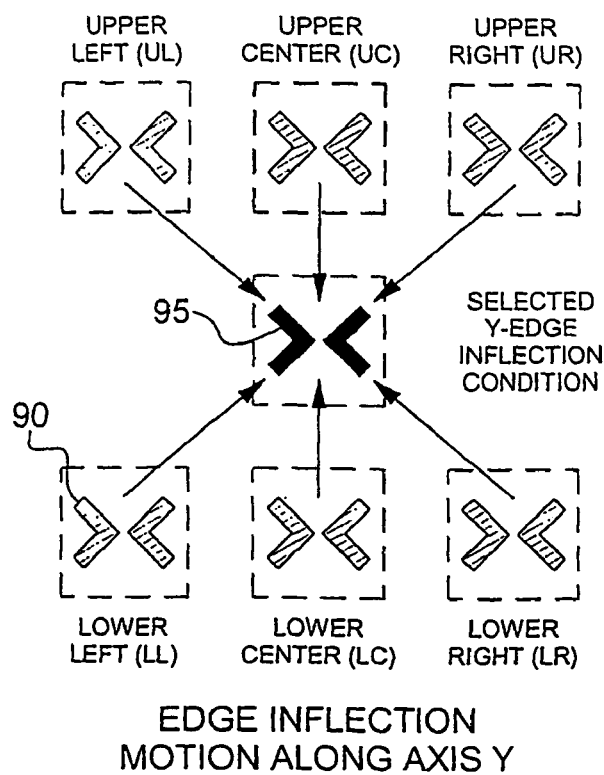

With reference to FIGS. 8, 9a and 9b, one will now describe the basic principle for detecting motion based on the above edge inflection data. FIG. 8 schematically shows an exemplary situation (in case of single axis motion detection) of a succession of ten successive edge direction conditions and extracted edge inflection conditions determined from two successive flashes (i.e. conditions derived from two successive light intensity patterns detected by the photodetector array). This exemplary situation is typical of sub-pixel motion (displacement of less than the pixel pitch between two successive flashes). As shown in FIG. 8, three edge inflection conditions are detected, namely a peak between the second and third edge direction conditions, a null between the fourth and fifth edge direction conditions, and a peak between the seventh and eighth edge direction conditions. Following the second flash, one can see that only the null condition moved one unit to the right (this situation again being typical of sub-pixel motion).

Preferably, peaks and nulls are tracked independently. One may envisage to track the edge inflection conditions without regard to their type. However, substantial information is lost in the process and precision decreases sharply. Logic is used to test for null motion or peak motion to either the left or right, i.e. with a first direction component along the axis or a second direction component along the axis opposite to the first direction component. Tracking along each axis may simply be achieved by associating at least one accumulator per axis (or alternatively two accumulators per axis for keeping track of motion of peaks and nulls separately) which is incremented or decremented according to the direction of motion of the edge inflection condition (this accumulator being left not adjusted in case of no motion of an edge inflection condition).

In addition to accumulators for tracking motion of edge inflection conditions, additional accumulators are provided for counting the total number of peaks and nulls appearing on each axis. One accumulator per axis may be provided for tracking the total number of edge inflection conditions (peaks and nulls together) or alternatively two distinct accumulators per axis for tracking the total number of peaks and nulls separately, this essentially depending on the calculation method which is used for computing the overall displacement measurement. Accordingly, for motion detection along two axes, a minimum of four accumulators is required (two accumulators for tracking motion of edge inflection conditions and two accumulators for counting the total number of edge inflection conditions). Again, a greater number of accumulators may however be provided, for instance a total of eight accumulator for keeping track of the motion and number of each edge inflection condition. One may also envisage using up to twelve accumulators in order to keep track of the four possible directions of motion of peaks and nulls separately along axes X and Y. Using more than four accumulators however requires later processing in order to mathematically process the output values of the corresponding accumulators.

Referring again to the exemplary situation of FIG. 8, and using two separate accumulators for tracking motion of peaks and nulls separately, one will understand that the accumulator associated to the tracking of nulls would be incremented and the accumulator associated to the tracking of peaks would be left not adjusted, the total number of peaks and nulls detected being in this case three. In case one uses a single accumulator for tracking motion of the peaks and nulls together, this would simply lead to incrementing the associated accumulator. In case of motion detection along two axes (as in the case of an optical pointing device), one will of course have understood that these steps are performed for each row of the array along axis X and each column of the array along axis Y.

FIGS. 9a and 9b schematically show an advantageous variant of the above principle which implements motion detection of edge inflection conditions along the diagonals of the first and second axes (hatched symbols 90 show the six possible neighbouring locations of an edge inflection condition while symbol 95 designates the detected target edge inflection condition). FIGS. 9a and 9b respectively illustrate the principle for edge inflection motion along axis X and Y. This variant can be implemented by incrementing or decrementing the appropriate accumulator, not only if a corresponding edge inflection condition comes from a neighbouring location on the same axis, but also if a corresponding edge inflection conditions comes from one of the four neighbouring locations along the diagonals as depicted in FIGS. 9a and 9b, i.e. along a direction which exhibits a direction component along the axis for which motion is determined. FIGS. 9a and 9b each illustrate the six possible directions (which all exhibit a direction component along the corresponding axis) from which an edge inflection condition could originate when looking at possible displacement along axis X and Y (motion detection along axis Y is actually similar to motion detection along axis X if one rotates 90 degrees the illustration of FIG. 9a).

The three possible cases (up, center, down in FIG. 9a and left, center, right in FIG. 9b) on each side of the target location are preferably logically summed (OR) together, so that one edge inflection condition can produce only one unit of motion. In other words, even if three identical edge inflection conditions were previously located near the target location, the accumulator is only incremented or decremented once.

Different methods may be envisaged for computing an overall displacement measurement based on the output values of the accumulators. A first of these calculation methods may consists in computing a displacement value for each type of inflection conditions (along each axis) and averaging these displacement values. This first calculation method may be summarized by the following analytical expressions:

$$X_{PEAK-DISPLACEMENT} = \frac{N_{PEAK-RIGHT} - N_{PEAK-LEFT}}{N_{XPEAK}} \quad (4)$$

$$X_{NULL-DISPLACEMENT} = \frac{N_{NULL-RIGHT} - N_{NULL-LEFT}}{N_{XNULL}} \quad (5)$$

$$Y_{PEAK-DISPLACEMENT} = \frac{N_{PEAK-UP} - N_{PEAK-DOWN}}{N_{YPEAK}} \quad (6)$$

$$Y_{NULL-DISPLACEMENT} = \frac{N_{NULL-UP} - N_{NULL-DOWN}}{N_{YNULL}} \quad (7)$$

$$Y_{DISPLACEMENT} = \frac{X_{PEAK-DISPLACEMENT} - X_{NULL-DISPLACEMENT}}{2} \quad (8)$$

$$Y_{DISPLACEMENT} = \frac{Y_{PEAK-DISPLACEMENT} - Y_{NULL-DISPLACEMENT}}{2} \quad (9)$$

$$X_{DISTANCE} = X_{DISPLACEMENT} \cdot L_{PP} \quad (10)$$

$$Y_{DISTANCE} = Y_{DISPLACEMENT} \cdot L_{PP} \quad (11)$$

The displacement $X_{PEAK-DISPLACEMENT}$ of peaks along axis X is thus calculated as the number $N_{PEAK-RIGHT}$ of peaks moving with a first direction component (i.e. right) along axis X minus the number $N_{PEAK-LEFT}$ of peaks moving with a second direction component along axis X opposite the first direction component (i.e. left), normalized by the total number $N_{XPEAK}$ of peaks detected along axis X. The displacement of nulls along axis X, as well as the displacement of peaks and nulls along axis Y are calculated in the same way. The peak and null displacements defined in expressions (4) to (7) above are then averaged and the result may be scaled by the pixel pitch $L_{PP}$ to give the overall distance moved along each axis, $L_{PP}$ being the pixel pitch in the appropriate units (microns, millimeters, inches, etc.). It will be appreciated that the overall result is always a fraction of the pixel pitch.

It will also be appreciated that this first calculation method necessitates at least four accumulators per axis to track the displacement of the edge inflection conditions and the total number of edge inflection conditions. As mentioned above, two separate accumulators may be used to track motion of the edge inflection conditions in each of the two possible directions along the selected axis, this however requiring an additional calculation step to compute the difference.

A second calculation method may alternatively consist in computing the displacement values along axes X and Y directly, as summarized by the following analytical expressions:

$$X_{DISPLACEMENT} = \frac{(N_{PEAK-RIGHT} + N_{NULL-RIGHT}) - (N_{PEAK-LEFT} + N_{NULL-LEFT})}{(N_{XPEAK} + N_{XNULL})} \quad (12)$$

$$Y_{DISPLACEMENT} = \frac{(N_{PEAK-UP} + N_{NULL-UP}) - (N_{PEAK-DOWN} + N_{NULL-DOWN})}{(N_{YPEAK} + N_{YNULL})} \quad (13)$$

$$X_{DISTANCE} = X_{DISPLACEMENT} \cdot L_{PP} \quad (14)$$

$$Y_{DISTANCE} = Y_{DISPLACEMENT} \cdot L_{PP} \quad (15)$$

This second method requires a minimum of two accumulators per axis, one for tracking motion of edge inflection conditions (peaks and nulls being still tracked independently) and another one for tracking the total number of edge inflection conditions detected along the selected axis. In order to allow greater flexibility in the calculation, one way use, as a minimum, four accumulators per axis so that either one of the above two calculation method may be implemented with the same motion detection device architecture.

It will be appreciated, that the above expressions of the X and Y displacements are not analytically identical. It has however been noticed in practice that the total number of peaks and nulls are substantially equal and that the two calculation methods accordingly give very close results.

In terms of processing, it will be appreciated that the second method is preferable since it does only require one division operation per axis, whereas the first one requires two such division operations and one average operation per axis.

"Peak/Null Motion Detecton" has other advantages that will be highlighted now. Firstly, the number of inflections "seen" by the detector is dependent on the sensor focus. In particular, the inflection count will decrease substantially if the sensor is out of focus (the sensor "sees" less features). This property can therefore be exploited in order to provide a "loss-of-focus" information. This can easily be implemented by counting the total number of X inflections and Y inflections (which number may directly be obtained from the output values of the accumulators used to count the number of edge inflection conditions) and comparing either count (X or Y inflections) with a pre-determined threshold. If this count is less than the predetermined threshold, a "loss-of-focus" condition will be detected and reported as a warning signal to the external controller.

Secondly, inflections are assumed to be moving through the array and those inflections should not move more than one pixel pitch between two flashes (the period between two successive flashes being determined so that this condition is always satisfied for a given maximum speed of motion). If an inflection moved more than one pixel pitch, the motion detection scheme cannot determine where the inflection came from. This condition will occur if the sensor is moving too fast with respect to the illuminated surface between two flashes, this condition being therefore representative of a "loss-of-tracking" situation. This condition can be detected by looking at the number of edge inflection conditions that appear to come from nowhere, i.e. the last state inflection conditions do not have a similar edge inflection condition in its current position or one pixel pitch around it. Those edge inflection conditions might be defined as "ghost edge inflection conditions" (such "ghost edge inflection conditions" potentially appearing along both axes). The number of "ghost edge inflection conditions" can thus be tested and tracked separately for each axis (two additional accumulators being therefore required) and compared to a predetermined threshold. If either count (ghost inflections along axis X or Y) is larger than the predetermined threshold, a "loss-of-tracking" condition may be detected and reported as a warning signal to the external controller. Provision are made in the logic not to count inflections at the edges of the photodetector array as ghost edge inflection conditions, even if they look like they came from nowhere. For instance, ghost edge inflection conditions on the edges of the array may come from outside the array, which the algorithm cannot tell.

With reference to FIGS. 10a, 10b, 11a, 11b and 12, one will now turn to the description of the second motion detection algorithm, the so-called "Local Edge Direction Motion Detection". This second algorithm is directly based on an analysis of the edge direction data and does not necessitate any data extraction processing prior to motion detection as before. This second algorithm basically consists in comparing the location of negative and positive edges with previous locations of these negative and positive edges, in other words detecting if a similar edge direction condition is located at a neighbouring location in the previous frame.

FIGS. 10a and 10b are two exemplary situations illustrating respectively a first no-motion case and a second partial-pixel-motion case. In both Figures, two sequences of ten edge direction conditions (positive and negative edges) along one axis which correspond to edge direction data determined respectively from two successive intensity patterns detected by the photodetector array, are illustrated. In both Figures, lines entitled "R" and "L" indicate whether the corresponding edge direction condition detected during the last flash moved to right and/or left when looking at the edge direction data derived from the current flash, value "1" and "0" respectively meaning that the corresponding edge direction condition did or did not move in the corresponding direction (right or left). This processing is not applied in connection with the edge direction conditions at the two ends of the sequence, since these conditions only have one adjacent edge direction condition.

In FIG. 10a, one will see that the total number of edge direction conditions detected to be moving with a first direction component (e.g. right) along the axis is equal to the total number of edge direction conditions detected to be moving with an opposite direction component (e.g. left) along the axis, this being of course representative of the fact that no motion occurred between the two flashes. It will be appreciated that, even in "no-motion" cases, localised "wrongly" detect movements of one or a couple of edge direction conditions may nevertheless be detected. It should however be stressed that, due to the statistical approach used within the scope of the present invention, such localised detected movements will not reflect an overall displacement of the sensing device and the effect of such movements will be minimised, in particular due to the weighting operation which consists in dividing the globally measured displacement by the number of edge direction conditions. This of course implies use of a photodetector array having a sufficiently high number of pixels, several hundreds being sufficient in practice.

Referring to FIG. 10b, one can see that six edge direction conditions are detected to be moving right whereas only four edge direction conditions are detected to be moving left, this implying that the overall motion R-L of edge direction conditions for the given sequence is two units to the right in this case. In order to get an estimation of the displacement of the sensor, expressed in a fraction of the unit of displacement (one unit corresponding to the pixel pitch), the above result has to be divided by the total number of "movable" edge direction conditions. As already mentioned, since edge direction conditions exist between every pixel of the array, and taking account of the fact that edge direction conditions located on the edges and corners are discarded, the total number of "movable" edge direction conditions is fixed and may be predetermined. In FIGS. 10a and 10b, ten edge direction conditions are illustrated and the two extreme edge direction conditions are discarded; the total number of movable edge direction conditions is therefore eight in this case. The resulting displacement along the axis is therefore +2/8=+0.25 (+ indicating motion to the right). The overall distance moved may be obtained by multiplying this displacement value with the pixel pitch.

Figure 11A:
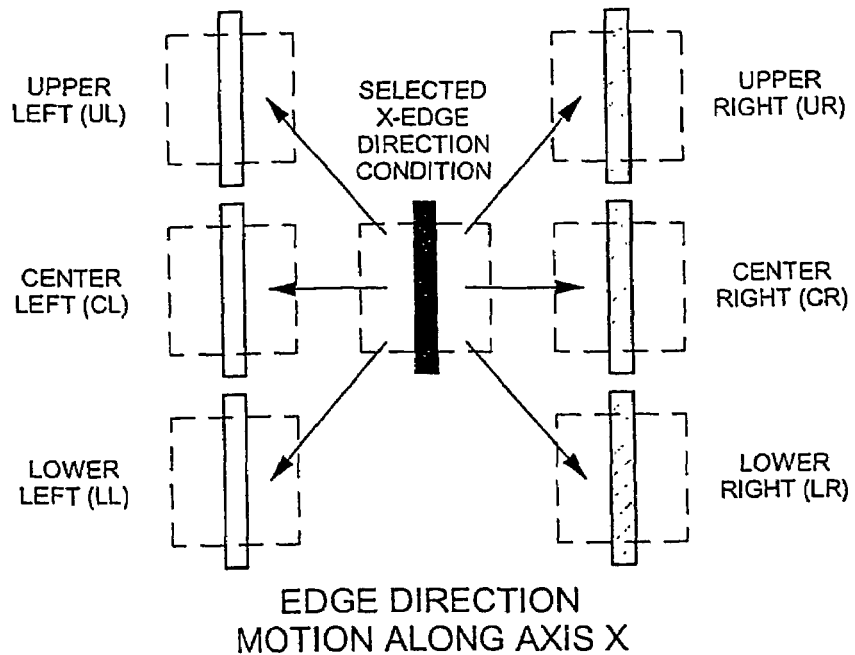
FIGS. 11a and 11b are schematic illustrations of a variant of the motion detection technique illustrated in FIGS. 10a and 10b, this time for motion detection along first and second axes, which further implements tracking of the positive and negative edges along diagonals of the first and second axes.
Figure 11B:
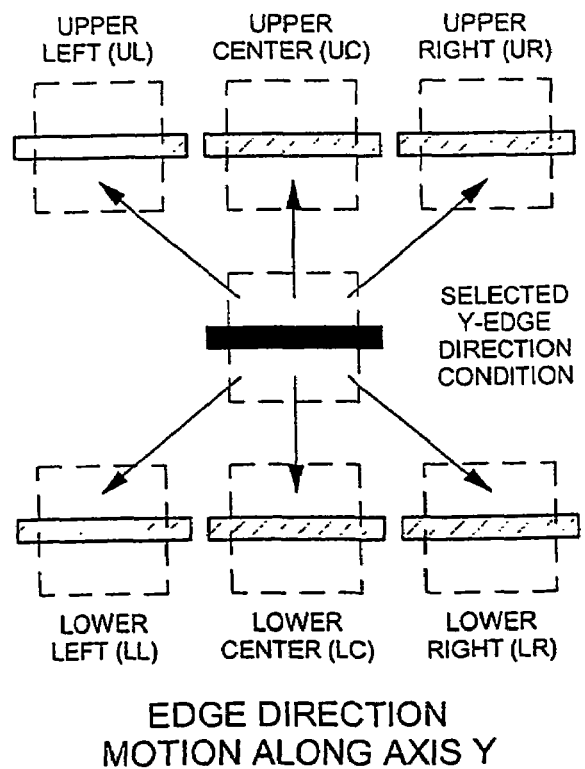

FIGS. 11a and 11b are somewhat similar to FIGS. 9a and 9b and illustrate and advantageous variant of the second algorithm which is adapted for motion detection along two axes and which further takes into account motion of edge direction conditions along diagonals of the two axes. Similarly, instead of only testing if an edge direction condition moved to one or the other direction along the selected axes, one also takes into account possible motion of the edge direction conditions along the two diagonals. This implies, for each axis, comparison of each edge direction condition with the six neighbouring edge direction conditions in the current and last frames of edge direction data.

For motion detection along axis X, as illustrated in FIG. 11a, this accordingly implies comparison of the selected edge direction condition along axis X (indicated by a wide dark line) of a first frame of edge direction data (e.g. the last frame) with the neighbouring edge direction conditions in the other frame of edge direction data (e.g. the current frame), i.e. the edge direction conditions located at the upper left (UL), center left (CL), lower left (LL), upper right (UR), center right (CR) and lower right (LR) locations (each corresponding edge direction condition being indicated by a wide hatched line). Similarly, for motion detection along axis Y, this implies comparison of the selected edge direction condition along axis Y with the neighbouring edge direction conditions located at the upper left (UL), upper center (UC), upper right (UR), lower left (LL), lower center (LC) and lower right (LR) locations. It should be stressed than the edge information corresponding to corner locations UL, UR, LL and LR used for motion detection along axis X is different from the edge information used for motion detection along axis Y, as illustrated by the different symbols used in FIGS. 11a and 11b to indicate the edge direction conditions (the same actually applies for the "Peak/Null Motion Detection" algorithm illustrated in FIGS. 9a and 9b).

A minimum of two accumulators is required to track motion of edge direction conditions as summarized above. Motion tracking of edge direction conditions along axis X may be performed by a single accumulator which is incremented when a selected edge direction condition, in the last frame of edge direction data, is found to have moved, in the current frame of edge direction data, in any of the upper right (UR), center right (CR) and lower right (LR) neighbouring locations, and which is decremented if the selected condition is found to have moved in any of the upper left (UL), center left (CL) and lower left (LL) neighbouring locations. Motion tracking of edge direction conditions along axis Y is performed in a similar manner by incrementing the accumulator when a selected edge direction condition, which has previously been detected and stored, is found to have moved in any of the upper left (UL), upper center (UC) and upper right (UR) neighbouring locations, and by decrementing the accumulator when the selected edge direction condition is found to have moved in any of the lower left (LL), lower center (LC) and lower right (LR) neighbouring locations.

It will be appreciated that more than two accumulators might be used. For instance, an accumulator may be provided for each direction of motion to test, i.e. six distinct accumulators per axis, which are each solely incremented if the corresponding motion test is positive. One will however understand that this additionally requires computation of sums and differences of the accumulators output values. As another alternative, one may use two sets of three accumulators each associated with one of the three possible axes of motion (reference axis X or Y and the two diagonals thereof) which are incremented and decremented according to the direction of motion along the selected axis.

In contrast to the prior algorithm, no accumulators is required for counting the total numbers of edge direction conditions along each axis, since these numbers are determined for a given photodetector array architecture.

In addition, it will be appreciated that instead of looking where a selected edge direction condition of a previous frame went to in the current frame of edge direction data, one may alternatively analyse where a selected edge direction condition of the current frame came from in the last frame of data. This analysis is simply reversed but perfectly equivalent. In any case, the two approaches are similar, since what is detected is actually the direction of motion of the edge direction conditions along the selected axes.

Different methods may again be envisaged for computing an overall displacement measurement based on the output values of the accumulators. One calculation method may for instance consist in computing a displacement value for each axis directly from the output value of a single accumulator associated to that axis and which is incremented or decremented based on the detected direction of motion of the edge direction conditions. This calculation method may be summarized by the following analytical expressions:

$$X_{DISPLACEMENT} = \frac{(N_{XUR} + N_{XCR} + N_{XLR}) - (N_{XUL} + N_{XCL} + N_{XLL})}{N_{XEDGES}} \quad (16)$$

$$Y_{DISPLACEMENT} = \frac{(N_{YUL} + N_{YUC} + N_{YUR}) - (N_{YLL} + N_{YLC} + N_{YLR})}{N_{YEDGES}} \quad (17)$$

$$X_{DISTANCE} = X_{DISPLACEMENT} \cdot L_{PP} \quad (18)$$

$$Y_{DISTANCE} = Y_{DISPLACEMENT} \cdot L_{PP} \quad (19)$$

where $N_{XUR}$, $N_{XCR}$, $N_{XLR}$, $N_{XUL}$, $N_{XCL}$ and $N_{XLL}$ are respectively the number of edge direction conditions along axis X detected to have moved in the upper right, center right, lower right, upper left, center left and lower left locations, $N_{YUL}$, $N_{YUC}$, $N_{YUR}$, $N_{YLL}$, $N_{YLC}$ and $N_{YLR}$ are respectively the number of edge direction conditions along axis Y detected to have moved in the upper left, upper center, upper right, lower left, lower center and lower right locations, and $L_{PP}$ is the pixel pitch.

One will now briefly describe a digital data accumulation architecture as well as a divider architecture which may be used for implementing the above accumulation and calculation schemes. These architectures will be described in relation with the first motion detection algorithm, but it shall be appreciated that these architectures are basically similar for both algorithms.

Figure 12:
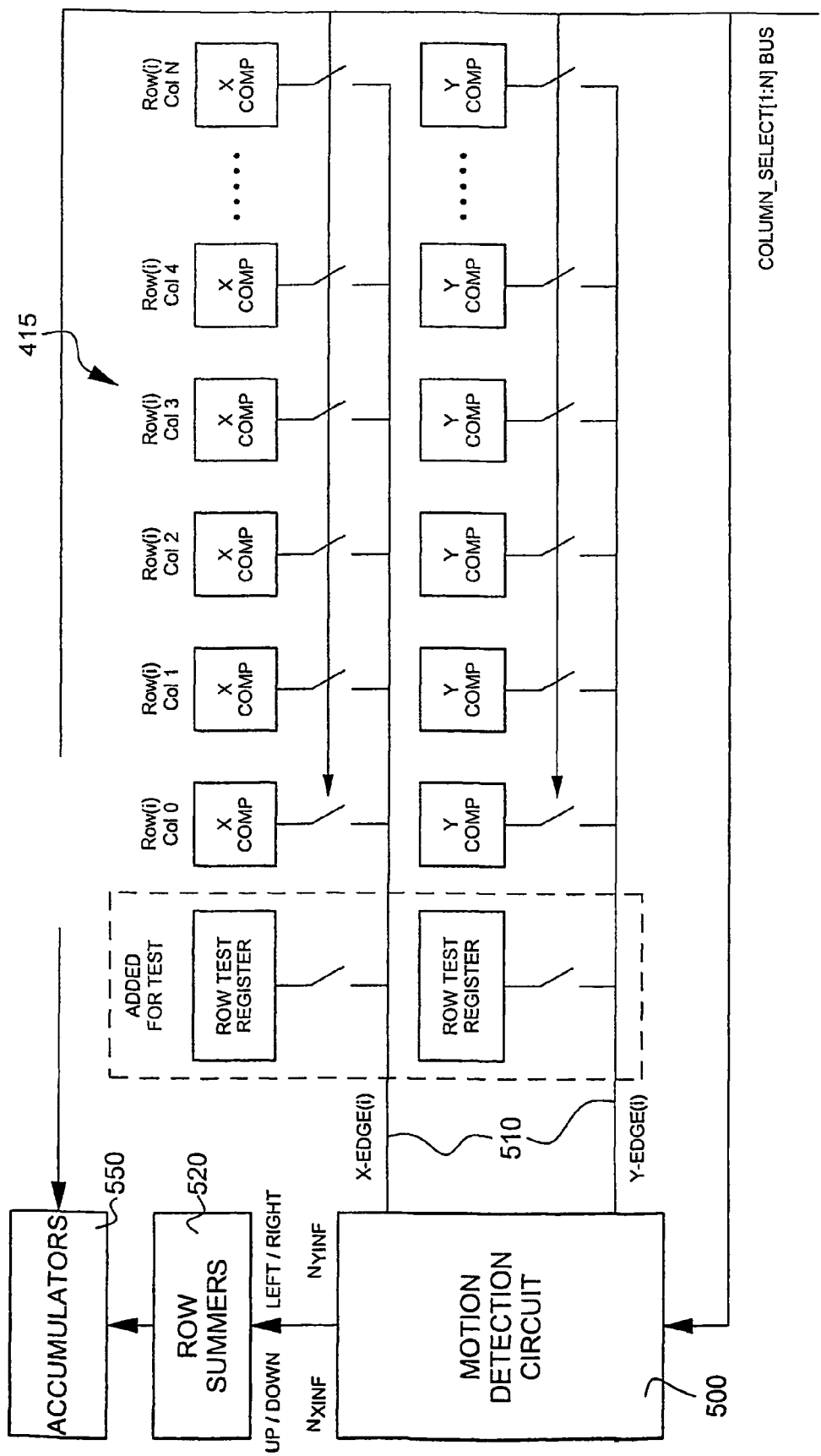
FIG. 12 is a schematic diagram of a circuit for digital data accumulation which may be used to track motion of edge inflection conditions.

FIG. 12 illustrates schematically a digital accumulation architecture for performing the above accumulation scheme. This Figure only illustrates the arrangement for one row of X and Y comparator circuits, i.e. comparator circuits of comparator array 415 in FIG. 3 which are associated to a given row, designated i, of the photodetector array. A whole column of edge direction data generated by the corresponding comparator circuits, indicated globally by reference numeral 415, is transmitted over a 2×M bus 510 to a motion detection circuit 500, number M corresponding to the number of rows in the photodetector array. Again, FIG. 12 only shows one bit of bus 510 corresponding to a given row of X and Y comparator circuits.

The outputs of comparator circuits in each column (i.e. 2 comparator circuits per column for a given row i, which respectively output an edge direction condition along axis X and an edge direction condition along axis Y corresponding to the selected row-column location) are selectively connected by means of switches to the motion detection circuit 500 over the bus, activation of these switches being controlled by means of a COLUMN_SELECT[1:N] bus according to an adequate timing scheme (each line of the bus switching a corresponding column switch).

Motion detection circuit 500 acquires and stores three columns of this data and contains all the registers needed to maintain the stored last state. The present state is analysed for peaks and nulls and is compared to the last state for motion detection according to the principles which have been described hereinabove. Conditions UP/DOWN, LEFT/RIGHT representative of the directions of motion derived from the detected edge inflection conditions, as well as the number of inflection conditions $N_{XINF}$ and $N_{YINF}$ along both axes, are supplied by motion detection circuit 500 to drive the appropriate accumulator circuits.

These accumulator circuits 550 (the number of which is dependent on the algorithm used) add (and/or subtract) values representative of the detected displacement and detected number of inflections according to the principles defined above during a single clock pulse for one column of edge data being tested.

As each column is transferred, the rows are added in a combinational summer (row summer circuit 520) following the motion detection circuit 500 to drive the accumulators 550, resulting in a low clock count to accumulate data. This approach requires N clock pulses to process all of the edge direction data, number N being the number of columns in the array. The row summer circuit 520 accordingly sums inflection and motion data over a column (or sums the rows of a column) and outputs data which might be as high as M, i.e. the number of rows.

Figure 13:
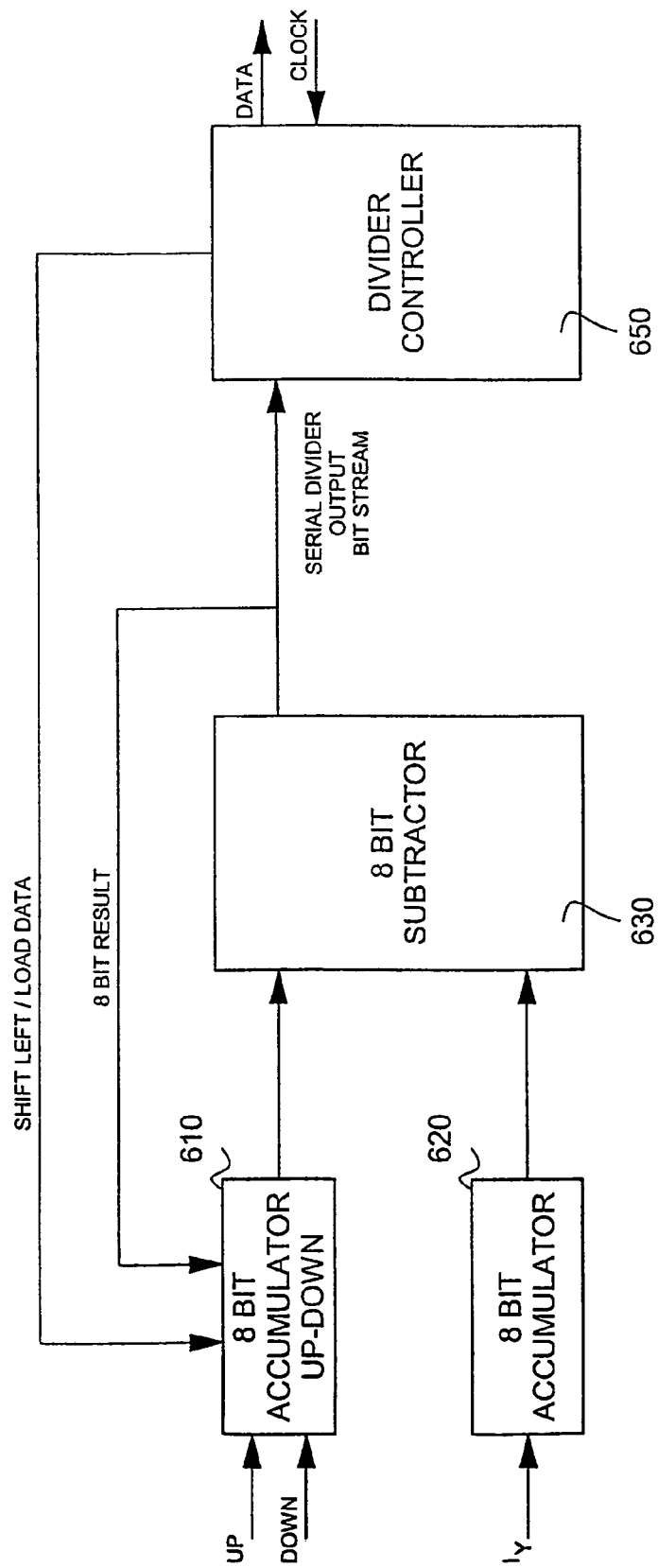
FIG. 13 is a schematic block diagram of a serial divider architecture for computing a measurement of a displacement value along one axis.

Turning to FIG. 13, one will now briefly describe a serial divider architecture for performing the mathematical operations which consists in computing the difference between the number of edge inflection conditions moving in one direction along the selected axis (X or Y) and the number of edge inflection conditions moving in the opposite direction (which difference is outputted by one motion detection accumulator designated 610), and dividing this difference with the output value of the corresponding accumulator, designated 620, used to track the total number of edge inflection conditions along the selected axis. This circuit architecture actually performs the computing operations defined in expressions (12), (13) above. The illustrated circuit architecture is more particularly intended for performing computing operation (13), i.e. calculation of the displacement value of edge inflection conditions along axis Y.

Motion detection accumulator 610, which may consist of an 8-bit up-down accumulator, is accordingly driven by two signals designated UP and DOWN, those signals being respectively representative of the total number of edge inflection conditions detected to be moving upwards and downwards. Similarly, accumulator 620, which may consist of an 8-bit accumulator, is controlled by a single control signal $I_Y$ representative of the total number of edge inflection conditions detected along axis Y. Both accumulators provide their output value to an 8-bit subtractor 630 which actually performs the division operation. The result is outputted in the form of a serial output bit stream to a divider controller 650, which both controls the operation of the whole architecture (in particular loading and shifting of data in accumulator 610) and formats the output data. The 8-bit output result supplied by subtractor 630 is also fed back to motion detection accumulator 610.

The architecture shown in FIG. 13 therefore forms a serial divider for computing the displacement value $Y_{DISPLACEMENT}$ defined in expression (13), a similar architecture being used for computing the other displacement value $X_{DISPLACEMENT}$. According to this example, eight clock pulses are needed for each value in order to perform the calculations and simultaneously read out the data.

For implementation of the "Local Edge Direction Motion Detection" algorithm, one may use a similar serial divider architecture, the sole difference residing in the fact that no accumulator 620 for tracking the total number of edge direction conditions is required, this number being fixed and predetermined for a given photodetector array configuration.

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For instance, the proposed embodiments are not necessarily limited to sensing devices comprising a regular array of pixels aligned along two orthogonal axes. Other pixel arrangements may be envisaged, such as pixel arrangements including pixels aligned along two (or more) non orthogonal axes.

Finally, it will again be appreciated that each comparator input may be connected to more than one photosensitive element. For instance, the output signals of several adjacent or even non-adjacent pixels may be summed so as to create a "filtered" pixel as schematically illustrated in FIG. 13 of U.S. patent application Ser. No. 10/001,963 mentioned hereinabove and from which priority is claimed.

The invention claimed is:

1. A method for measuring relative motion between an illuminated portion of a surface (S) and an optical sensing device comprising a photodetector array (420), said method comprising the steps of:
   a) detecting by means of said photodetector array a first light intensity pattern of said illuminated portion of the surface at a first point in time;
   b) comparing light intensity between neighbouring pixels of said photodetector array and determining edge direction data from said detected first light intensity pattern, which data is descriptive of light intensity differences between said neighbouring pixels and includes:
      a first edge condition, or positive edge, defined as a condition wherein the light intensity of a first pixel is less than the light intensity of a second pixel; and
      a second edge condition, or negative edge, defined as a condition wherein the light intensity of said first pixel is greater than the light intensity of said second pixel;
   c) storing said edge direction data or data extracted therefrom;
   d) detecting a second light intensity pattern of said illuminated portion of the surface at a second point time;
   e) comparing light intensity between neighbouring pixels of said photodetector array and determining said edge direction data from said detected second light intensity pattern; and
   f) determining a measurement of the relative motion between said optical sensing device and said illuminated portion of the surface based on a comparison of said edge direction data determined at steps b) and e) or based on a comparison of data extracted from said edge direction data.

2. The method of claim 1, wherein said photodetector array includes a plurality of rows and columns of pixels respectively aligned along first and second axes (X, Y) and wherein said edge direction data is determined along each of said first and second axes.

3. The method of claim 1, wherein said steps b) and e) further include the step of extracting edge inflection data from said edge direction data, said edge inflection data being descriptive of the succession of positive and negative edges along at least one determined axis (X; Y) of said photodetector array and including:
   a first inflection condition, or peak, defined as the succession, along said determined axis, of a positive edge followed by a negative edge; and
   a second inflection condition, or null, defined as the succession, along said determined axis, of a negative edge followed by a positive edge; and
   and wherein said step f) includes:
   f1) comparing locations of the inflection conditions determined at step e) with previous locations of the inflection conditions determined at step b);
   f2) determining the direction of motion of said inflection conditions along said determined axis based on the result of said comparison; and
   f3) computing an overall displacement measurement ($X_{DISPLACEMENT}$; $Y_{DISPLACEMENT}$) from the determined direction of motion of said inflection conditions.

4. The method of claim 3, wherein said step c) includes storing said edge direction data or said edge inflection data.

5. The method of claim 3, wherein said step f) includes decrementing or incrementing an accumulator (550, 610) according to the direction of motion of said inflection condition.

6. The method of claim 5, wherein a first accumulator (620) per axis tracks the total number of inflection conditions and wherein at least a second accumulator (610) per axis tracks the direction of motion of said inflection conditions.

7. The method of claim 3, wherein said photodetector array includes a plurality of rows and columns of pixels respectively aligned along first and second axes (X, Y) and wherein the direction of motion of said inflection conditions is determined along each of said first and second axes.

8. The method of claim 7, wherein the direction of motion of an inflection condition is further determined along first and second diagonals of said first and second axes.

9. The method of claim 8, wherein step f) includes:
detecting whether an inflection condition moved following any of eight possible directions along said first and second axes and said diagonals;
incrementing a first accumulator associated to said first axis when an inflection condition moved along said first axis or said diagonals with a first direction component along said first axis;
decrementing said first accumulator when an inflection condition moved along said first axis or said diagonals with a second direction component along said first axis opposite said first direction component;
incrementing a second accumulator associated to said second axis when an inflection condition moved along said second axis or said diagonals with a third direction component along said second axis; and
decrementing said second accumulator when an inflection condition moved along said second axis or said diagonals with a fourth direction component along said second axis opposite said third direction component.

10. The method of claim 3, further comprising the step of counting a total number of peaks and/or nulls and providing a loss-of-focus warning signal if said total number is less than a predetermined threshold.

11. The method of claim 3, wherein step f) further comprises counting a number of peaks and/or nulls which do not originate from any neighbouring location or which do not correspond to previously detected peaks and/or nulls, and providing a loss-of-tracking warning signal if said total number is larger than a predetermined threshold.

12. The method of claim 3, wherein the direction of motion of said peaks, along said determined axis (X; Y), is determined independently of the direction of motion of said nulls,
a displacement value of said peaks ($X_{PEAK-DISPLACEMENT}$; $Y_{PEAK-DISPLACEMENT}$) being defined as the ratio of:
(i) the difference between the number of peaks ($N_{PEAK-RIGHT}$; $N_{PEAK-UP}$) moving with a first direction component along said determined axis and the number of peaks ($N_{PEAK-LEFT}$; $N_{PEAK-DOWN}$) moving with a second direction component along said determined axis opposite said first direction component, and
(ii) the total number of peaks ($N_{XPEAK}$; $N_{YPEAK}$) along said determined axis, a displacement value of said nulls ($X_{NULL-DISPLACEMENT}$; $Y_{NULL-DISPLACEMENT}$) being defined as the ratio of:
(i) the difference between the number of nulls ($N_{NULL-RIGHT}$; $N_{NULL-UP}$) moving with a first direction component along said determined axis and the number of nulls ($N_{NULL-LEFT}$; $N_{NULL-DOWN}$) moving with a second direction component along said determined axis opposite said first direction component, and
(ii) the total number of nulls ($N_{XNULL}$; $N_{YNULL}$) along said determined axis,
said overall displacement measurement ($X_{DISPLACEMENT}$; $Y_{DISPLACEMENT}$) being defined as the average displacement value of the displacement value of said peaks and of the displacement value of said nulls.

13. The method of claim 3, wherein the direction of motion of said peaks, along said determined axis (X; Y), is determined independently of the direction of motion of said nulls,
said overall displacement measurement ($X_{DISPLACEMENT}$; $Y_{DISPLACEMENT}$) being defined as the ratio of:
(i) the difference between the number of inflection conditions ($N_{PEAK-RIGHT}$+$N_{NULL-RIGHT}$; $N_{PEAK-UP}$+$N_{NULL-UP}$) moving with a first direction component along said determined axis and the number of inflection conditions ($N_{PEAK-LEFT}$+$N_{NULL-LEFT}$; $N_{PEAK-DOWN}$+$N_{NULL-DOWN}$) moving with a second direction component along said determined axis opposite said first direction component, and
(ii) the total number of inflection conditions ($N_{XPEAK}$+$N_{XNULL}$; $N_{YPEAK}$+$N_{YNULL}$) along said determined axis.

14. The method of claim 1, wherein said step c) includes storing said edge direction data,
and wherein said step f) includes:
f1) comparing locations of the positive and negative edges determined at step e) with previous locations of the positive and negative edges determined at step b);
f2) determining the direction of motion of said positive and negative edges along at least one determined axis (X; Y) based on the result of said comparison; and
f3) computing an overall displacement measurement ($X_{DISPLACEMENT}$, $Y_{DISPLACEMENT}$) from the determined direction of motion of said positive and negative edges.

15. The method of claim 14, wherein said step f) includes detecting whether a positive or negative edge moved to a neighbouring location and incrementing an accumulator (550, 610) associated to the corresponding neighbouring location.

16. The method of claim 14, wherein said photodetector array (420) includes a plurality of rows and columns of pixels respectively aligned along first and second axes (X, Y) and wherein the direction of motion of said positive and negative edges is determined along each of said first and second axes.

17. The method of claim 16, wherein the direction of motion of positive and negative edges is further determined along diagonals of said first and second axes.

18. The method of claim 17, wherein step f) includes:
detecting whether a positive or negative edge moved following any of eight possible directions along said first and second axes and said diagonals;
incrementing and/or decrementing at least a first accumulator associated with said first axis according to the direction of motion of the positive or negative edge along said first axis or said diagonals; and
incrementing and/or decrementing at least a second accumulator associated with said second axis according to the direction of motion of the positive or negative edge along said second axis or said diagonals.

19. The method of claim 14, wherein the direction of motion of said positive edges, along said determined axis (X; Y), is determined independently of the direction of motion of said negative edges, said overall displacement measurement ($X_{DISPLACEMENT}$, $Y_{DISPLACEMENT}$) being defined as the ratio of:
(i) the difference between the number of edge direction conditions ($N_{XUR}$+$N_{XCR}$+$N_{XLR}$; $N_{YUL}$+$N_{YUC}$+$N_{YUR}$) moving with a first direction component along said determined axis and the number of edge direction conditions ($N_{XUL}$+$N_{XCL}$+$N_{XLL}$; $N_{YLL}$+$N_{YLC}$+$N_{YLR}$)

moving with a second direction component along said determined axis opposite said first direction component, and (ii) the total number of edge direction conditions ($N_{XEDGES}$; $N_{YEDGES}$) along said determined axis.

20. The method of claim 1, wherein when light intensity of said first pixel is equal to light intensity of said second pixel, either a positive edge or a negative edge is defined between said first and second pixels.

21. The method of claim 1, wherein said steps b) and e) include comparing light intensity of first and second pixels with implementation of a hysteresis function to prevent randomness of the edge direction condition between said first and second pixels when light intensity of the first pixel is equal to light intensity of the second pixel.

22. The method of claim 1, wherein light intensity is compared between non-adjacent neighbouring pixels, in particular between first and second pixels which are aligned along a determined axis of said photodetector array and which are separated by an intermediate pixel located on said determined axis, a positive or negative edge being defined as being located at a location corresponding to the location of said intermediate pixel.

23. A motion detection device for detecting relative motion with respect to an illuminated portion of a surface (S), this motion detection device comprising:
a photodetector array (420) including a plurality of pixels aligned along first and second axes (X, Y) for detecting a light intensity pattern of said illuminated portion of the surface;
comparator means (415) coupled to said photodetector array for comparing light intensity between neighbouring pixels of said photodetector array along both said first and second axes and for outputting edge direction data from said detected light intensity pattern, which data is descriptive of light intensity differences between said neighbouring pixels and includes:
a first edge condition, or positive edge, defined as a condition wherein the light intensity of a first pixel is less than the light intensity of a second pixel; and
a second edge condition, or negative edge, defined as a condition wherein the light intensity of said first pixel is greater than the light intensity of said second pixel;
storage means for at least temporarily storing said edge direction data or data extracted therefrom;
processing means (400, 500, 520, 550, 610, 620, 630, 650) for determining a measurement of the relative motion with respect to said illuminated portion of the surface based on a comparison of said edge direction data or data extracted therefrom which is determined from first and second light intensity patterns successively detected by said photodetector array.

24. The motion detection device of claim 23, wherein said comparator means (415) comprises a comparator array including a plurality of comparator circuits each for comparing the light intensity of a first pixel with the light intensity of a second pixel and for outputting a resulting edge direction condition.

25. The motion detection device of claim 24, wherein said comparator array is placed outside an active region (4500) of said photodetector array.

26. The motion detection device of claim 24, wherein said comparator circuits implement a hysteresis function.

27. The motion detection device of claim 23, wherein said processing means (400) comprise means for extracting edge inflection data from said edge direction data, said edge inflection data being descriptive of the succession of positive and negative edges along the first (X) or second axis (Y) of said photodetector array (420) and including:
a first inflection condition, or peak, defined as the succession, along said first or second axis, of a positive edge followed by a negative edge; and
a second inflection condition, or null, defined as the succession, along said first or second axis, of a negative edge followed by a positive edge,
said processing means comprising:
means for comparing locations of said inflection conditions with previous locations of said inflection conditions;
means for determining the direction of motion of said inflection conditions along both said first and second axes (X, Y) based on the result of said comparison; and
means for computing an overall displacement measurement ($X_{DISPLACEMENT}$, $Y_{DISPLACEMENT}$) from the determined direction of motion of said inflection conditions.

28. The motion detection device of claim 27, wherein said processing means (400) include:
a first accumulator (620) for counting the number of inflection conditions ($N_{XPEAK}$; $N_{XNULL}$; $N_{XINF}$) appearing along said first axis;
a second accumulator (620) for counting the number of inflection conditions ($N_{YPEAK}$; $N_{YNULL}$; $N_{YINF}$) appearing along said second axis;
a third accumulator (610) for computing the difference between the number of inflection conditions ($N_{PEAK-RIGHT}$; $N_{NULL-RIGHT}$) moving with a first direction component along said first axis (X) and the number of inflection conditions ($N_{PEAK-LEFT}$; $N_{NULL-LEFT}$) moving with a second direction component along said first axis (X) opposite said first direction component;
a fourth accumulator (610) for computing the difference between the number of inflection conditions ($N_{PEAK-UP}$; $N_{NULL-UP}$) moving with a third direction component along said second axis (Y) and the number of inflection conditions ($N_{PEAK-DOWN}$; $N_{NULL-DOWN}$) moving with a fourth direction component along said second axis (Y) opposite said third direction component, and
computing means (630, 650) for computing said overall displacement measurement based on the values outputted by said accumulators.

29. The motion detection device of claim 28, wherein peaks and nulls are tracked independently, said device comprising a first set of said four accumulators for tracking said peaks and a second set of said four accumulators for tracking said nulls separately,
said computing means comprising
means (630) for computing a first displacement value of said peaks ($X_{PEAK-DISPLACEMENT}$) and a first displacement value of said nulls ($X_{NULL-DISPLACEMENT}$), along said first axis (X), based on the ratio of the output values of said third (610) and first (620) accumulators;
means (630) for computing a second displacement value of said peaks ($Y_{PEAK-DISPLACEMENT}$) and a second displacement value of said nulls ($Y_{NULL-DISPLACEMENT}$), along said second axis (Y), based on the ratio of the output values of said fourth (610) and second (620) accumulators;
means for computing a first average displacement value along said first axis (X) from the first displacement values of said peaks and nulls; and means for computing a second average displacement value along said second axis (Y) from the second displacement values of said peaks and nulls.

30. The motion detection device of claim 28, wherein peaks and nulls are tracked independently, said device comprising a single set of said four accumulators for tracking said peaks and nulls together, said computing means comprising:

means (630) for computing a first displacement value ($X_{DISPLACEMENT}$) of said inflection conditions, along said first axis, based on the ratio between the output values of said third (610) and first (620) accumulators; and means (630) for computing a second displacement value ($Y_{DISPLACEMENT}$) of said inflection conditions, along said second axis, based on the ratio between the output values of said fourth (610) and second (620) accumulators.

31. The motion detection device of claim 28, wherein said third and fourth accumulators (620) are further used to track motion of said inflection conditions along diagonals of said first and second axes.

32. The motion detection device of claim 23, wherein said processing means (400) comprise:

means for comparing locations of the positive and negative edges with previous locations of the positive and negative edges;

means for determining the direction of motion of said positive and negative edges along both said first and second axes (X, Y); and means for computing an overall displacement measurement ($X_{DISPLACEMENT}$, $Y_{DISPLACEMENT}$) from the determined direction of motion of said positive and negative edges.

33. The motion detection device of claim 32, wherein said processing means include:

at least a first accumulator (610) for tracking edge direction conditions moving along said first axis;

at least a second accumulator (610) for tracking edge direction conditions moving along said second axis; and computing means (630, 650) for computing said overall displacement measurement ($X_{DISPLACEMENT}$, $Y_{DISPLACEMENT}$) based on the values outputted by said accumulators.

34. The motion detection device of claim 33, wherein said positive and negative edges are tracked independently, said computing means comprising:

means (630) for computing a first displacement ($X_{DISPLACEMENT}$) value along said first axis (X) based on the ratio of:

the difference between the number of edge direction conditions ($N_{XUR}+N_{XCR}+N_{XLR}$) moving with a first direction component along said first axis and the number of edge direction conditions ($N_{XUL}+N_{XCL}+N_{XLL}$) moving with a second direction component along said first axis opposite said first direction component, and the total number of edge direction conditions ($N_{XEDGES}$) along said first axis (X), means (630) for computing a second displacement value ($Y_{DISPLACEMENT}$) along said second axis (Y) based on the ratio of:

the difference between the number of edge direction conditions ($N_{YUL}+N_{YUC}+N_{YUR}$) moving with a third direction component along said second axis and the number of edge direction conditions ($N_{YLL}+N_{YLC}+N_{YLR}$) moving with a fourth direction component along said second axis opposite said third direction component, and the total number of edge direction conditions ($N_{YEDGES}$) along said second axis (Y).

35. The motion detection device of claim 27, further comprising means for counting a total number of peaks and/or nulls and providing a loss-of-focus warning signal if said total number is less than a predetermined threshold.

36. The motion detection device of claim 27, further comprising means for counting a number of peaks and/or nulls which do not originate from any neighbouring location or which do not correspond to previously detected peaks and/or nulls, and providing a loss-of-tracking warning signal if said total number is greater than a predetermined threshold.

37. The motion detection device of claim 24, wherein each comparator circuit compares light intensity between non-adjacent neighbouring pixels, in particular between first and second non-adjacent neighbouring pixels which are aligned along the first or second axis of said photodetector array and which are separated by an intermediate pixel located on the same axis, a positive or negative edge outputted by said comparator circuit being defined as being located at a location corresponding to the location of said intermediate pixel.

* * * * *

UNITED STATES PATENT AND TRADEMARK OFFICE
CERTIFICATE OF CORRECTION

PATENT NO. : 7,122,781 B2
APPLICATION NO. : 10/497020
DATED : October 17, 2006
INVENTOR(S) : Robert R. Rotzoll et al.

It is certified that error appears in the above-identified patent and that said Letters Patent is hereby corrected as shown below:

On the title page of the patent, col. 1, after line 24, please insert item (30) as follows:

item --(30) DOMESTIC APPLICATION PRIORITY DATA
Dec. 5, 2001..............................................10/001,963
Dec. 5, 2001..............................................60/335,792--

Col. 1, after line 5, please insert the following:

--This is a National Phase Application in the United States of International Patent Application No. PCT/EP02/13686 filed December 3, 2002, which claims priority on Non-Provisional U.S. Patent Application No. 10/001,963, filed December 5, 2001 and on Provisional U.S. Patent Application No. 60/335,792, filed December 5, 2001.--

Signed and Sealed this

Twenty-fourth Day of June, 2008

JON W. DUDAS
*Director of the United States Patent and Trademark Office*